United States Patent
Metcalfe et al.

(10) Patent No.: US 11,489,339 B2
(45) Date of Patent: *Nov. 1, 2022

(54) MEASUREMENT-BASED DYNAMIC MODELING OF AN ELECTRICAL NETWORK

(71) Applicant: Power Management Holdings (U.S.), Inc., Waukesha, WI (US)

(72) Inventors: Malcolm Stuart Metcalfe, North Vancouver (CA); Severin Nowak, North Vancouver (CA); John Sankey, North Vancouver (CA); Eric Young, Denver, CO (US)

(73) Assignee: Power Management Holdings (U.S.), Inc., Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,377

(22) Filed: Sep. 10, 2021

(65) Prior Publication Data

US 2022/0115869 A1   Apr. 14, 2022

Related U.S. Application Data

(63) Continuation of application No. 16/600,356, filed on Oct. 11, 2019, now Pat. No. 11,146,066, which is a
(Continued)

(51) Int. Cl.
*G06F 1/26* (2006.01)
*H02J 3/00* (2006.01)
(Continued)

(52) U.S. Cl.
CPC ............... *H02J 3/16* (2013.01); *H02J 3/1814* (2013.01); *H02J 3/1878* (2013.01); *H02J 3/1892* (2013.01)

(58) Field of Classification Search
CPC ........................................................ H02J 3/16
See application file for complete search history.

(56) References Cited

U.S. PATENT DOCUMENTS

| 9,762,087 B2 | 9/2017 | Metcalfe et al. |
| 10,044,188 B2 | 8/2018 | Metcalfe |

(Continued)

FOREIGN PATENT DOCUMENTS

| CA | 291266 A1 | 5/2015 |
| CA | 2984385 A1 | 11/2016 |

(Continued)

OTHER PUBLICATIONS

European Patent Office, International Search Report and Written Opinion for PCT/US2019/056000, dated Dec. 10, 2019.
(Continued)

*Primary Examiner* — Jared Fureman
*Assistant Examiner* — Esayas G Yeshaw
(74) *Attorney, Agent, or Firm* — Merchant & Gould P.C.

(57) ABSTRACT

A system and a method for locally controlling delivery of electrical power along the distribution feeder by measuring certain electricity parameters of a distribution feeder line using a substation phasor measurement unit (PMU) electrically coupled to a substation distribution bus at a first node on the feeder line, and at least one customer site PMU electrically coupled to a low voltage end of a transformer at a customer site, wherein the transformer is coupled by a drop line to a second node on the distribution feeder line and the customer site is coupled by another drop line to the transformer, and by controlling at least one controllable reactive power resource and optionally a real power resource connected to the second node or at the customer site. Related apparatus, systems, articles, and techniques are also described.

20 Claims, 9 Drawing Sheets

Related U.S. Application Data continuation-in-part of application No. PCT/CA2018/050670, filed on Jun. 5, 2018.

(60) Provisional application No. 62/517,044, filed on Jun. 8, 2017, provisional application No. 62/744,873, filed on Oct. 12, 2018, provisional application No. 62/744,874, filed on Oct. 12, 2018.

(51) Int. Cl.
  *H02J 3/16* (2006.01)
  *H02J 3/18* (2006.01)

(56) References Cited

U.S. PATENT DOCUMENTS

| | | | |
|---|---|---|---|
| 10,367,354 | B2 | 7/2019 | Tyler et al. |
| 2004/0090725 | A1* | 5/2004 | Rehtanz ............ H02J 3/00 361/62 |
| 2007/0135970 | A1* | 6/2007 | Zhou ............ H02J 3/383 700/286 |
| 2008/0052059 | A1* | 2/2008 | Kim ............ G01R 31/343 703/13 |
| 2009/0265042 | A1* | 10/2009 | Mollenkopf ............ H04Q 9/00 700/298 |
| 2011/0178643 | A1 | 7/2011 | Metcalfe |
| 2012/0033473 | A1 | 2/2012 | Scharf |
| 2013/0030597 | A1 | 1/2013 | Milosevic et al. |
| 2013/0193951 | A1 | 8/2013 | Korovin et al. |
| 2014/0375472 | A1 | 12/2014 | Sankey |
| 2015/0280435 | A1 | 10/2015 | Metcalfe et al. |
| 2016/0099607 | A1 | 4/2016 | Landis |
| 2016/0313197 | A1 | 10/2016 | Acharya et al. |
| 2017/0110979 | A1 | 4/2017 | Chang et al. |
| 2017/0307676 | A1 | 10/2017 | Gaouda et al. |
| 2017/0371306 | A1 | 12/2017 | Sossan et al. |
| 2018/0095123 | A1 | 4/2018 | Biswas et al. |
| 2018/0131188 | A1 | 5/2018 | Metcalfe |
| 2018/0226799 | A1 | 8/2018 | Baker et al. |
| 2019/0363543 | A1* | 11/2019 | Shariatzadeh ............ H02J 3/16 |
| 2019/0369147 | A1 | 12/2019 | Liu et al. |
| 2020/0295564 | A1 | 9/2020 | Metcalfe et al. |
| 2021/0083477 | A1 | 3/2021 | Metcalfe et al. |

FOREIGN PATENT DOCUMENTS

| | | |
|---|---|---|
| CA | 2786720 C | 9/2018 |
| CN | 104300552 A | 1/2015 |
| CN | 106655207 A | 5/2017 |
| EP | 2788832 | 10/2014 |
| WO | 2011085477 A1 | 1/2011 |
| WO | 2013086238 | 6/2013 |
| WO | 2016176775 A1 | 11/2016 |

OTHER PUBLICATIONS

Cagano et al.; "Centralized voltage control for distribution networks with embedded PV systems," Renewable Energy, vol. 76, pp. 176-185, Nov. 26, 2014.

Extended European Search Report and Opinion; EP Application No. 18814399.4, dated Feb. 12, 2021, 8 pages.

International Search Report and Written Opinion of the International Searching Authority, PCT/CA2018050670, dated Jul. 17, 2018, 8 pages.

International Search Report and Written Opinion issued in International Publication No. PCT/IB2020/052326, dated May 29, 2020, 3 pages.

Mahmud et al.; "Review of control strategies for voltage regulation of the smart distribution network wihthigh penetration of renewable distributed generation," Renewable and Sustainable Energy Review, vol. 64, pp. 582-595, Jul. 8, 2016.

Schweitzer et al., "Real-time Power System Control Using Synchrophasors," 2008 61st Annual conference for Protective Relay Engineers, College Station, Texas, 2008, pp. 78-88.

Schweitzer et al., "Synchrophasors-based power system protection and control applications," 2010 63rd Annual conference for Protective Relay Engineers, College Station, Texas, 2010, pp. 1-10.

\* cited by examiner

MEASUREMENT-BASED DYNAMIC MODELING OF AN ELECTRICAL NETWORK

CROSS-REFERENCE TO RELATED APPLICATIONS

This application is a continuation of U.S. application Ser. No. 16/600,356, filed on Oct. 11, 2019, which is a continuation-in-part of and claims the benefit of international Appl. No. PCT/CA2018/050670, filed Jun. 5, 2018, which claims priority to U.S. Appl. No. 62/517,044 filed Jun. 8, 2017. U.S. application Ser. No. 16/600,356 also claims priority to U.S. Appl. No. 62/744,873, filed on Oct. 12, 2018, and claims priority to U.S. Appl. No. 62/744,874, filed on Oct. 12, 2018. The entire contents of each of the foregoing are hereby expressly incorporated by reference herein in their entireties. To the extent appropriate, a claim of priority is made to each of the above disclosed applications.

FIELD

This disclosure relates generally to a system and method for characterizing and controlling aspects of an electrical distribution network including feeder line parameters such as voltage, current, real power, reactive power, and phase angle.

BACKGROUND

Management of an electrical utility distribution system has become a challenging and potentially costly problem. The widespread and growing installation of intermittent generation (e.g. solar, wind) connected to this system is largely responsible for the challenges because this type of generation was never included in the initial design of the distribution system, and voltage variations caused by the intermittency are lowering power quality of electricity delivered to customers coupled to distribution feeder lines of the system, and lowering the reliability of the system itself under some increasingly common circumstances.

SUMMARY

According to one aspect, there is provided a method for measuring one or more electricity parameters of a distribution feeder line without directly connecting measurement sensors to it except at the substation, comprising: using a micro phasor measurement unit (μPMU) coupled to the distribution feeder line at a first node at the substation, measuring a voltage phasor at the first node; using a μPMU at a customer's site coupled through the low voltage side of a voltage-reducing transformer at that customer site that has known, measurable, or calculated properties, wherein the transformer is coupled on its high voltage side to the distribution feeder line at a second node by a drop line and to electrical equipment at the customer's site on its low voltage side, including the customer site μPMU, by a drop line, where the μPMU measures a voltage phasor and a current phasor at the customer site with respect to a specified time reference; determining the transformer and drop line properties from measurements using environmental sensors and from configured parameters; determining a voltage drop impedance (voltage drop phasor) between the second node and the customer site μPMU from the transformer and drop line properties and a current phasor measured by the customer site μPMU; determining a voltage phasor at the second node by adding the voltage phasor measured by the customer site μPMU and the determined voltage drop impedance between the second node and the customer site μPMU; and determining the one or more electricity parameters of the distribution feeder line from the measured voltage phasor at the first node (substation) and the determined voltage phasor at the second node.

The electricity parameters include at least real power flow across a first feeder line sector between the first node and second node, reactive power flow across the first feeder line sector, and current on the first feeder line sector.

The voltage drop phasor between the second node and the customer site can be determined by the product of the measured current phasor at the customer site measurement unit and the drop impedance phasor between the second node and the customer site measurement unit, wherein the drop impedance phasor is defined by:

$$Z_{22L} \tan^{-1} \frac{X_{22}}{R_{22}}$$

wherein $Z_{22}$ represents the drop impedance between the second node and the customer site measurement unit, $X_{22}$ represents the drop reactance between the second node and the customer site measurement unit, and $R_{22}$ represents the drop resistance between the second node and the customer site measurement unit. $X_{22}$ and $R_{22}$ are known or calculated from the transformer properties, the drop line properties, and sensor measurements potentially taken at the location, such as outside air temperature and transformer temperature. The additional measurements may be used to increase the accuracy of the drop impedance calculation as necessary depending on the application to which the electrical feeder line parameters will be put.

The real power flow across a feeder line sector (a section of feeder between two adjacent nodes) can be defined by:

$$P_{ij} = \frac{1}{R^2 + X^2}(R|V_i|^2 - R|V_i||V_j|\cos\delta + X|V_i||V_j|\sin\delta)$$

Wherein $|V_i|$ is the magnitude of the voltage phasor at the upstream node (node i which is electrically closer to the substation), $|V_j|$ is the magnitude of the voltage phasor at the downstream node (node j which is electrically further from the substation), δ is the angle of the voltage phasor at the downstream node, and R and X are a resistance and a reactance of the first feeder line sector.

According to another aspect, there is provided a system for measuring one or more electricity parameters of a distribution feeder line, comprising: a μPMU located at a substation and coupled to a distribution feeder line at a first node, for measuring a voltage phasor at the first node; at least one customer site μPMU coupled to a low voltage side of a transformer of at least one customer site, for measuring a voltage phasor and a current phasor at the customer site, and wherein the customer site μPMU is coupled to the distribution feeder line at a second node through a drop line to a transformer that is coupled to the distribution feeder line at the second node by a drop line; and a processor and a memory having encoded thereon program code executable by the processor to:
(i) determine a voltage drop phasor between the second node and the customer site measurement unit from a measured current phasor and a measured voltage phasor at the customer site measurement unit and a known, measured, or calculated drop impedance between the second node and the customer site;

(ii) determine a voltage phasor at the second node by adding a measured voltage phasor at the customer site measurement unit and the determined voltage drop phasor between the second node and the customer site; and (iii) determine the one or more electricity parameters of the distribution feeder line from a measured voltage phasor at the first node and a determined voltage phasor at the second node.

According to another aspect, there is provided a method for locally controlling delivery of electrical power along a distribution feeder of an electricity grid, wherein the distribution feeder comprises a substation and a plurality of nodes, and the substation has time-referenced voltage and current waveform measurement, and the plurality of nodes comprises connections carrying electrical energy to a plurality of customer sites through drop lines connected to voltage transformers, and at least one customer site contains at least one controllable reactive power source and time-referenced voltage and current waveform measurement wherein the time-reference at the customer site is the same or synchronized to the time reference at the substation. The method comprises: determining voltage and current phasors at each of an upstream node and at a downstream node of the feeder sector, where determining the phasors means computing the phasors at the node from phasor measurements on lines connected to the node through at least a transformer and a drop line; setting a target voltage phasor at the downstream node as a value that maintains the real power value at the upstream node, and when total reactive power injected at the upstream and downstream nodes collectively generates all reactive power consumed by the feeder sector; and adjusting operation of the at least one controllable reactive power resource so that the actual voltage magnitude at the downstream node moves towards the magnitude of the target voltage phasor. Adjusting the operation of the at least one controllable reactive power resource can comprise using a reactive power device that increases reactive power to increase the actual voltage magnitude and using a reactive power device that decreases reactive power to decrease the actual voltage magnitude.

The plurality of customer sites can comprise at least one controllable real power resource, in which case the method further comprises: adjusting operation of the at least one controllable real power resource so that the actual phase angle at the downstream node moves towards the phase angle of the target voltage phasor.

The plurality of customer sites can include a node having an intermittent power generation source, in which case the method further comprises adjusting the target phasor setting at each node after a change in power generation from the intermittent power generation source.

According to another aspect, there is provided a system for determining voltage and current phasors and locally controlling delivery of electrical power along a distribution feeder of an electricity grid. The distribution feeder comprises a substation and a plurality of nodes. The substation has time-referenced voltage and current waveform measurement. The nodes comprise connections to customer sites for delivering electrical energy. The connections comprise drop lines and voltage transformers. A pair of adjacent nodes define a feeder sector of the distribution feeder wherein at least one of the nodes has a connection to a customer site with at least one controllable reactive power resource and time-referenced voltage and current waveform measurement wherein the time-reference at the customer site is the same or synchronized to the time reference at the substation. The system comprises: at least two time-referenced voltage and current waveform measurement units with one of the measurement units at the substation and another at a customer site and the measurement units are have a common time reference or are time synchronized with each other; at least one reactive power resource controller communicative with and programmed to control operation of the at least one reactive power resource; and a server computer communicative with the at least two time-referenced voltage and current measurement units and with at least one reactive power resource controller. The server computer comprises a processor and a memory having encoded thereon program code executable by the processor to:

(i) receive a voltage and current phasor measurements, or their equivalents, from measurement units at a substation and at customer sites coupled to a distribution feeder;

(ii) determine an actual voltage magnitude at an upstream node and at a downstream node of the feeder sector, and a real power value at the upstream node;

(iii) compute a target voltage phasor at the downstream node as a value that improves the performance of the distribution feeder or the equipment attached to it; and (iv) transmit the target voltage phasor to the at least one reactive power resource controller, such that the at least one reactive power resource controller operates the at least one controllable reactive power resource so that the actual voltage magnitude at the downstream node moves towards the magnitude of the target voltage phasor; and (v) transmit a target voltage phase to any real power resource controller, such that the real power resource controller operates the at least on real power resource so that the actual voltage phase at the downstream node moves toward the phase of the target voltage phasor.

In one embodiment the target voltage phasor for a downstream node on a feeder sector is determined to maintain the real power value at the upstream node of the feeder sector, and when total reactive power injected at the upstream and downstream nodes collectively generates all reactive power consumed by the feeder sector.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings

DRAWINGS

DETAILED DESCRIPTION

Figure 3:
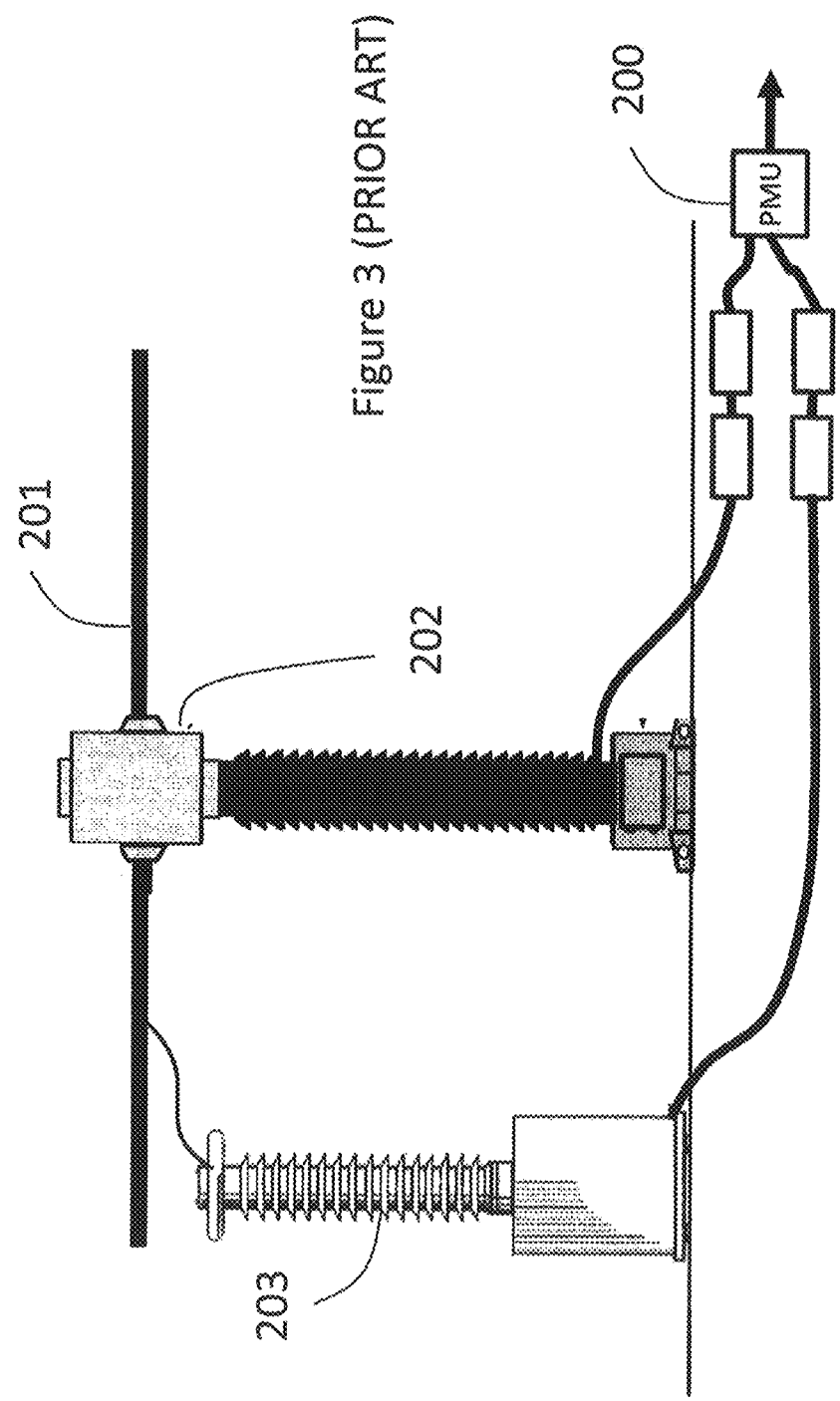
FIG. 3 is a schematic of a method and apparatus for measuring certain electricity parameters on a distribution feeder line.

Distribution systems have been largely passive in nature, connecting utility substations to customer sites along a distribution feeder line. The utility has generally managed feeder lines (most typically voltage levels on the lines) using measurements taken at the substation and using controls also at the substation. For example, the utility compensates for low voltage at the end of the feeder by adjusting the substation voltage with a load tap changer (LTC), a purely mechanical device on a transformer in the substation that is designed to correct slowly varying voltage and current changes by moving a physical contact thereby adjusting the turns ratio of the transformer. Additionally, capacitor banks installed along the distribution feeder line can provide reactive power support to maintain customer site voltages within defined limits. But these capacitor banks are usually only grossly controllable by at most a switch per capacitor bank. Intermittent generation connected directly to the distribution system (as opposed to the bulk transmission system), especially from renewable sources, has brought a valuable source of energy to the electricity grid, but the intermittency of generation and extremely coarse control have caused issues, largely because the designers of the distribution systems did not foresee these use cases. To address these issues, attempts have been made to measure and control certain parameters along distribution feeder lines. Referring to FIG. 3, it is known to use a phasor measurement unit (PMU) 200 to measure parameters of a distribution feeder line 201 by electrically coupling the PMU 200 to a current transformer 202 (CT) and a potential transformer 203 (PT) that are respectively electrically coupled to the feeder line 201. A PMU is a device which measures the electrical waves on an electricity grid using a shared time source for synchronization with one or more other PMUs. Time synchronization allows synchronized, real-time measurements of multiple remote measurements points in an electricity grid. In particular, time synchronization allows measurement of the relative angles between voltage waveforms and current waveforms at different points on the distribution system. A PMU can be a dedicated device, or PMU functionality can be incorporated into a protective relay or other device.

However, measurements of feeder line parameters with PTs and CTs are costly, typically involving two PTs and three CTs per installation, mounted at intervals along the distribution feeder line, and costing in the order of $30,000-$50,000 per installation. Directly connecting PTs and CTs to the feeder lines requires large, expensive devices because the feeder lines typically operate at 10's of kilovolts (KV) and carry hundreds of amps (A) of current. This cost practically limits the number of measurement points on the distribution feeder line that can be justified. This scarcity of direct measurements of the voltage and current waveforms has limited the control strategies that utilities have been able to use to manage distribution feeder voltage levels, energy losses, and substation equipment wear-and-tear. Historically this hasn't been a big cost for utilities, but solar power and other intermittent power generation on distribution feeders is driving up all of these costs.

In recent years, an increased penetration of intermittent generation in the electricity grid is causing significant control problems. For example, connected solar capacity as low as 10% of peak capacity on a distribution feeder may result in voltage violations that are beyond ANSI-defined limits. This intermittent generation capacity must be balanced with either load or generation adjustments elsewhere on the electricity grid in order to maintain system frequency. Often, a generation facility used for balancing is located a significant distance from a feeder containing the intermittent generation resulting in significant marginal power losses, which in some cases may exceed 30%.

Also, intermittent generation tends to cause voltage changes that can result in poor customer power quality and excess wear-and-tear on substation tap changers. These substation tap changers incur increased maintenance needs and failure rates resulting from increased use caused by the intermittency. To avoid conflict between utility voltage management systems that manage tap changes and voltage regulation capability on solar inverters, as well as to avoid potential poor regulation caused by customer equipment, intermittent generator operators have been forbidden from regulating the system voltage (IEEE 1547 and California Rule 21). Many electrical utilities have been using their historical tools of monitoring line voltages at the substation and at a few points on the feeder and installing some in line capability to selectively manage voltage. This old-school approach tends to be slow in response time, and costly for the utility to implement.

Some utilities have made the investment in more comprehensive distribution feeder measurement in order to use optimal power flow control (OPF) algorithms. There are OPF algorithms generally known in the art directed to minimizing loss or cost in an electrical distribution system. There exists optimization algorithms and relaxations which consider constraints such as generation limits, transmission thermal limits, bus voltage limits, number of switching operations etc. These algorithms tend to seek to solve the following non-linear power flow equations:

$$P_k = V_k \sum_{n=1}^{N} Y_{kn} V_n \cos(\delta_k - \delta_n - \theta_{kn})$$

$$Q_k = V_k \sum_{n=1}^{N} Y_{kn} V_n \sin(\delta_k - \delta_n - \theta_{kn})$$

where $P_k$ and $Q_k$ are real power (P) and reactive power (Q) delivered to bus k in a N bus system defined by $Y_{kn}$ (Ybus matrix of the system) and $V_k$, $\delta_k$ is the voltage magnitude and phase at bus k and $\theta_{kn}$ is the angle of the admittance $Y_{kn}$.

Some OPF approaches lead to complex optimization problems requiring high computational resources, which can result in relatively slow reaction by power control systems executing these algorithms.

As it is desirable to respond quickly to intermittent power generation in an electrical distribution system, it is desirable to provide a means for controlling power delivery in an electrical distribution system that improves on prior art approaches.

Embodiments of the subject matter described herein relate generally to a system and a method for determining certain electricity parameters of a distribution feeder line using two or more micro phasor measurement units (μPMU) electrically coupled to the feeder line, comprising a substation μPMU electrically coupled to a substation distribution bus at a first node on the feeder line, and at least one customer site μPMU electrically coupled to a low voltage side of a transformer at a customer site. The transformer is coupled by a drop line to a second node on the distribution feeder line and the μPMU is coupled by a drop line to the transformer, and using the determined distribution feeder line electricity parameters in a control system that computes target voltage phasors for each node on the feeder line which are then sent to voltage management resource controllers collocated with the substation μPMU and customer site μPMU to control voltage management resources such that the actual voltage phasor at each node moves toward the target voltage phasor for the node.

A μPMU is a type of PMU that is a more appropriate for use on a distribution network because of its ability to measure small phases. PMU's used on transmission networks often measure phase to within 1 degree which is adequate due to the high voltages and low currents on transmission lines. These transmission line PMUs though must be connected at 100's or even 1000's of kV, which is expensive and complex. Distribution lines operate at much lower voltages, and customer sites at lower voltages still. These μPMU's need to measure phase to within 0.01 degrees because of the higher current but are easier to connect because of the lower voltages. Many μPMUs also include a GPS receiver to act as a time reference for all measurements.

In some implementations, the method comprises determining a voltage drop between the second μPMU and the second node on the distribution feeder using voltage and current phasor measurements taken by the second μPMU and knowing, measuring, and/or calculating the impedance (e.g., voltage drop phasor) between the second node and the customer site μPMU given the transformer and the drop line properties and optionally environmental measurements such as air temperature and transformer temperature. Then, the voltage phasor (voltage magnitude and phase angle) at the second node can be calculated by adding the determined voltage drop and a customer site voltage phasor as measured by the second μPMU. Using the voltage phasors (the measured voltage phasor at the substation, or the determined voltage phasor at any other node) for two adjacent nodes on the distribution feeder, electricity parameters such as real power, reactive power, and current across a feeder line sector between the adjacent nodes are determined. As a result, the electricity parameters on the distribution feeder line can be measured without the need to install relatively expensive PTs and CTs on the distribution feeder line.

The method also comprises using the electricity parameters so determined to compute loss in the distribution feeder sectors and compute target voltage phasors for each node that improve the performance of the distribution line, where improved performance can include reduce energy loss, reduced mechanical wear-and-tear on substation components (such as tap changes), and/or improved power quality delivered to customers. The target voltage phasors can be used to control voltage management resources electrically coupled to the nodes to cause the actual voltage phasor at each node to change in the direction of the target voltage phasor for that node and thereby improve the performance of the distribution feeder.

In one embodiment the target voltage phasors are determined to meet a feeder line power loss threshold while reducing the mechanical movement of voltage management equipment at the substation, such as line tap changers.

In another embodiment the target voltage phasors are determined to meet the reactive power consumed by each feeder sector using Optimal Power Flow calculations for a balanced, radial distribution system.

Throughout the disclosure where a server or computer is referenced it may include one or more servers or computers in communication with each other through one or more networks or communication mediums. Each server and computer generally comprise one or more processors and one or more non-transitory computer readable mediums in communication with each other through one or more networks or communication mediums. The one or more processors may comprise any suitable processing device known in the art, such as, for example, application specific circuits, programmable logic controllers, field programmable gate arrays, microcontrollers, microprocessors, virtual machines, and electronic circuits. The one or more computer readable mediums may comprise any suitable memory devices known in the art, such as, for example, random access memory, flash memory, read only memory, hard disc drives, optical drives and optical drive media, or flash drives. In addition, where a network is referenced it may include one or more suitable networks known in the art, such as, for example, local area networks, wide area networks, intranets, extranets, virtual private networks, and the Internet. Further, where a communication to a device or a direction of a device is referenced it may be communicated over any suitable electronic communication medium and in any suitable format known to in the art, such as, for example, wired or wireless mediums, compressed or uncompressed formats, encrypted or unencrypted formats.

System

Figure 1:
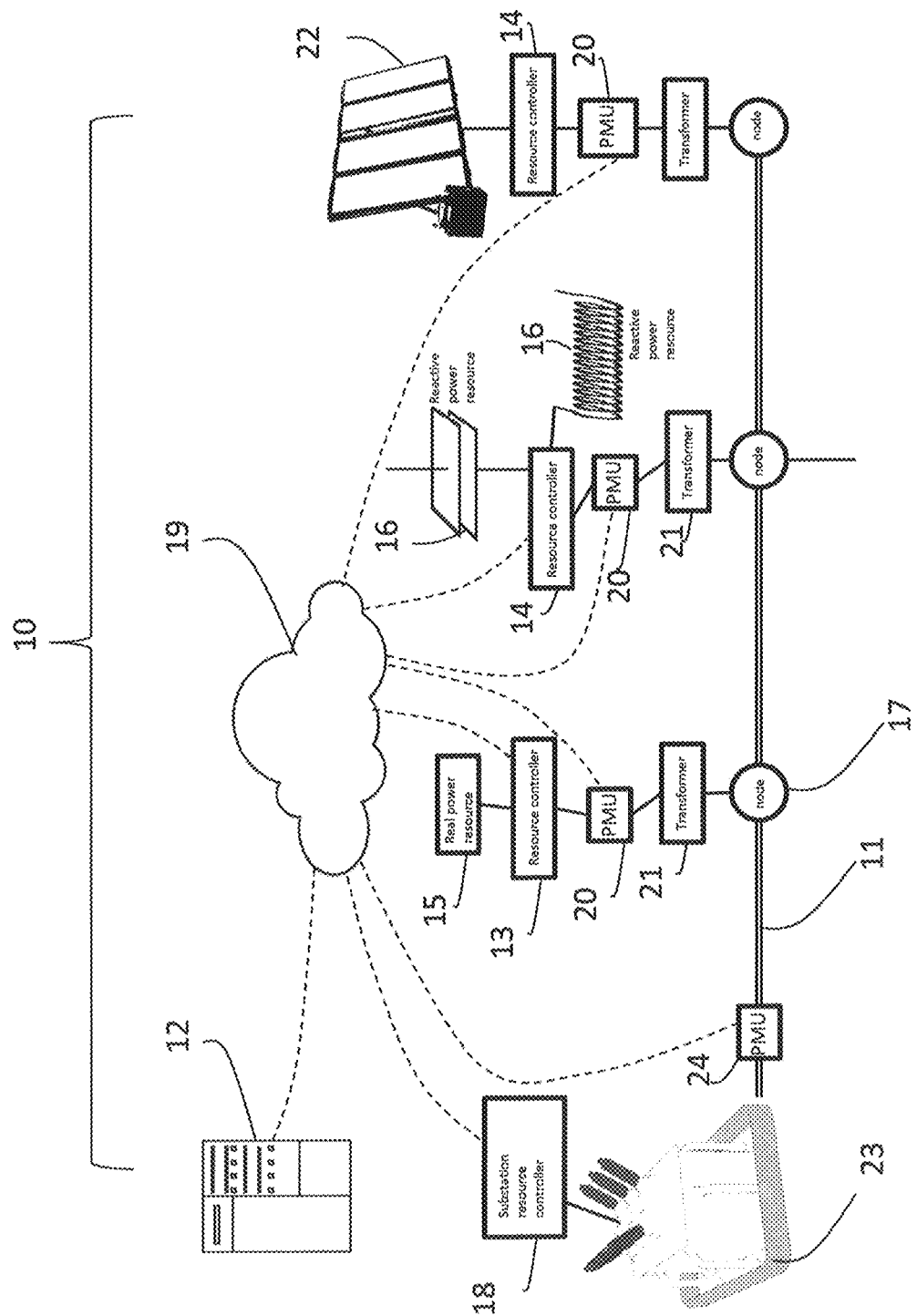
FIG. 1 is a block diagram of an apparatus for providing distributed control to resources on a distribution feeder of an electricity grid according to one embodiment.

According to one embodiment and referring to FIG. 1, a local power control system 10 for providing local control of power delivery along a distribution feeder 11 comprises a central server computer 12, μPMUs for measuring voltage and current phasors on low voltage connections 20, controllers 13 for controlling real power resources 15, controllers 14 for controlling reactive power resources 16 along the feeder (respectively referred to as "real power resource controllers" 13 and "reactive power resource controllers" 14), and controllers 18 for controlling utility voltage management devices 23. The controllers 13, 14, 18 and the µPMUs 20 are communicative with the server computer 12 over a network 19 such as the Internet, either directly or with the addition of security tunneling hardware or software; alternatively, the server computer 12 can be fitted with dedicated communication links to the controllers 13, 14, 18 and µPMUs 20 such as Frame Relay.

The distribution feeder 11 comprises a plurality of nodes 17 that connect to customer sites, wherein some customer sites have one or more controllable reactive power resources 16, some nodes 17 have one or more controllable real power resources 15 and other nodes 17 have one or more non-controllable resources such as an intermittent power generation source 22. For the sake of simplicity, FIG. 1 illustrates a first node 17 having one controllable real power resource 15, a second node 17 having two controllable reactive power resources 16, namely a reactive power consuming device and a reactive power generating device, and a third node having a non-controllable solar power generation resource 22. The distribution feeder also comprises a substation comprising a µPMU 24 coupled to the distribution line 11, one or more tap changers 23 also coupled to the distribution line 11, and/or other utility voltage management devices.

The real and reactive power resources 15, 16 are typically located along the node sites 17 at locations remote from the server computer 12. The real power resources 15 can be electrical generators having capacity to generate power ("generation resource"), electricity-powered devices having capacity to consume a load ("load resource"), and storage devices having capacity to store energy ("storage resource") for short periods and later release it back to the grid. Reactive power resources 16 that "generate" reactive power include capacitors, STATCOMs, solar (PV) inverters, and reactive power resources 16 that "consume" reactive power include solar (PV) inverters and inductors.

In this example embodiment, the controllable real power resources 15 are all load resources, and in particular comprise multiple single-speed water pumps, analog electrical boilers, and analog electrical blowers. These real power-consuming load resources 15 are normally intended to serve a primary process other than providing local power control to a feeder (herein referred to as "process load resources"), and the server computer 12 is configured to operate these load resources 15 to provide local power control only within the operational constraints defined by the original primary processes of these process load resources 15. For example, the water pumps are used primarily to regulate the water level in a municipal water supply tank, each electrical boiler is used primarily to provide heat and domestic hot water for a building as part of a hybrid electric-gas heating system, and the blowers are used primarily to aerate a waste water treatment tank.

A load resource controller 13 that controls the process load resource 15 and communicates with the remotely located server computer 12 is installed at the customer site which is connected to a node 17 through a transformer 21. A time-referenced µPMU 20 that communicates with the load resource controller 13 or the server computer 12 is also installed at the customer site and is coupled to the drop line that connects to the low voltage side of the transformer 21. As will be explained in detail below, each load resource controller 13 receives target phasor setpoints from the server computer 12 comprising a target voltage magnitude and a target phase angle, and is programmed to operate the process load resource 15 at a load setpoint that causes the actual phase angle at the node site 17 to move towards the target phase angle, but is also programmed to only operate the process load resource 15 when the load setpoint is within the operational constraints of the process load resource 15 (typically defined by the load resource's own control system). In other words, the load resource controller 13 is programmed to allow the load resource's primary control system to override the load resource controller 13 when the operators of the primary process require the process load resource 15 to be used for its primary processes. For example, a municipal water plant operator may require that a water tank be kept between 10% and 90% full of water, and the load resource controller 13 is programmed to allow the server computer 12 to operate the pumps for this tank while the water level is within this range in order to provide local power control to the feeder 11. However, when the water level in the tank rises to 90% full, the load resource's control system will be allowed to turn the pumps on, even if the server computer 12 desires the pumps to be kept off. Controllable process load resources 15 which are being used at a given time to serve their primary process are considered to be "off-line" to the server computer 12 and not available to provide local power control; conversely, controllable load resources 15 which are within their primary operational constraints are considered "on-line" and available to be used to provide local power control. "Off-line" load resources 15 are compensated for by the server computer 12 with other "on-line" load resources 15 so that the overall power control functionality is preserved.

The load resource controller 13 in this embodiment is a small rugged computer with capability to connect to the Internet 19, and to connect to the load resources 15 at their respective resource node sites 17. The connection between the load resource controller 13 and the server computer 12 is achieved through the internet 19, using a secure means of communications. The load resource controller 13 is connected to the generation resource, load resource, or storage resource using one of a number of methods, including: direct wiring to controllers or governors of the load resource control system; direct connection to the Supervisory Control and Data Acquisition (SCADA) System used to control the process load resource 15 at the resource node site 17, or connection to the network 19 used by the control system at the node site 17 that controls the load resource 15. The real power resource controller 13 is also connected to metering devices (not shown) that measure, to standards required by an appropriate regulatory authority, the power being delivered or consumed by the process load resources 15.

The load resource controller 13 may be connected to additional measurement equipment (not shown) as required to ensure that operating constraints can be properly met, by: direct wiring to controllers or measurement equipment; direct connection to the SCADA System used to measure the process load resources 15 at the resource node site 17; or connection to a network 19 used by the load resource's control system at the node site 17 to measure the process load resource 15.

In operation, the load resource controller 13 will receive a target phasor signal from the server computer 12, directing a change in consumption or generation from one or more of the process load resources 15 at the node site 17. The real power resource controller 13 will validate the received signal against the operating constraints of the process load resource 15 and clamp the signal if required. The control system of the load resource 15 will send the setpoint signal to the process load resource 15 identified by the server computer 12, commanding the requested change.

At every update interval (e.g. 2 seconds), the μPMU will send voltage and current phasors or magnitudes and zero-crossing timestamps to the server computer 12 directly or to the load resources controller 13 for local use or retransmission to the server computer 12, and the load resources controller 13 will send a series of signals to the server computer 12, specifically:

The status or level of operation of each process load resource 15 at the resource node site 17 (there may be multiple load resources connected to each load resource control system). The load resource controller 13 will aggregate and send a total power signal to the server computer 12, reflecting the power generated or consumed at that site;

The load resource controller 13 will send a separate signal to the server computer 12 to define the maximum and minimum power levels that are available for the existing process load resources 15 at the resource node site 17;

Any additional state information required by the server computer 12 to execute its costing subroutine, as will be described below; and An indicator if the load resource controller 13 itself, or the SCADA, or the load resource control system, has suspended server computer 12 control, and the current local control setpoint if the server computer 12 control is suspended.

The load resource controller 13 will then store the command status and the power levels measured for every resource at the resource node site 17. Data storage at the local load resource controller 13 should be sufficient to maintain all records for an extended period of time, for example two years. The server computer 12 and the load resource 15 are time-synchronized so that all time-stamped communications between nodes 17 can be properly interpreted by the server computer 12 and the load resource controller 13. The control and status protocol between the server computer 12 and the load resource controller 13 insures that network issues (e.g. packet loss or reordering), does not cause incorrect control actions. The system will run continuously, with an intended cycle time between the server computer 12 and the load resource controller 13 of about 5-10 seconds, and 5-60 seconds for larger systems. Local storage of data is maintained, time stamped in the meters, in the server computer 12 and in the control system of the load resources 15.

Like the load resource controllers 13, the reactive power resource controllers 14 are located at each node site 17 of reactive power resources 16 along with a μPMU 20, and are operable to control the operation of those reactive power resources 16. The reactive power resource controller 14 has the same hardware design as the load resource controller, and is programmed to control the reactive power resources 16. Similarly, the utility resource controller 18 is of the same or similar hardware design as the load and reactive power resource controllers 13, 14 with programming adapted to control the utility voltage management devices 23.

The server computer 12 is a redundant server computer system, equipped with a reliable operating system such as Linux, real time software, and a long-term database. The server computer 12 is desirably installed at a secure location, protected from unauthorized physical access, where there is a reliable connection to the internet and a backed-up supply of electricity. For example, the server computer 12 may be installed at the substation. The server computer 12 may be a system that is spread across multiple hardware chassis either to aggregate sufficient processing capability, or to provide redundancy in the event of failure, or both. One chassis can operate as the primary server computer 12, and another as a backup server computer 12. Each chassis can run a multi-core capable operating system. The server computer 12 runs a measurement program to process the measurements from the μPMUs and a control program to generate voltage target phasors for the resource controllers.

According to another example embodiment, the local power control system 10 comprises controllers 14 for controlling reactive power resources but does not comprise controllers for controlling real power resources. As will be explained in more detail below, each reactive power resource controller 14 receives target voltage phasor setpoints from the server computer 12, and is programmed to operate the reactive power resource 16 at a setpoint that causes the actual voltage magnitude at the node 17 to move towards the magnitude of the target voltage phasor setpoints. Since this alternative embodiment does not involve controlling real power resources, the phase angle along the distribution line is not controlled. By controlling the reactive power, it is possible to influence the phase angle difference in a system that has an X/R ratio of line impedance of around 1.

According to an alternative embodiment the measurement program and the control program are run on different computers.

Measurement Program

Figure 2:
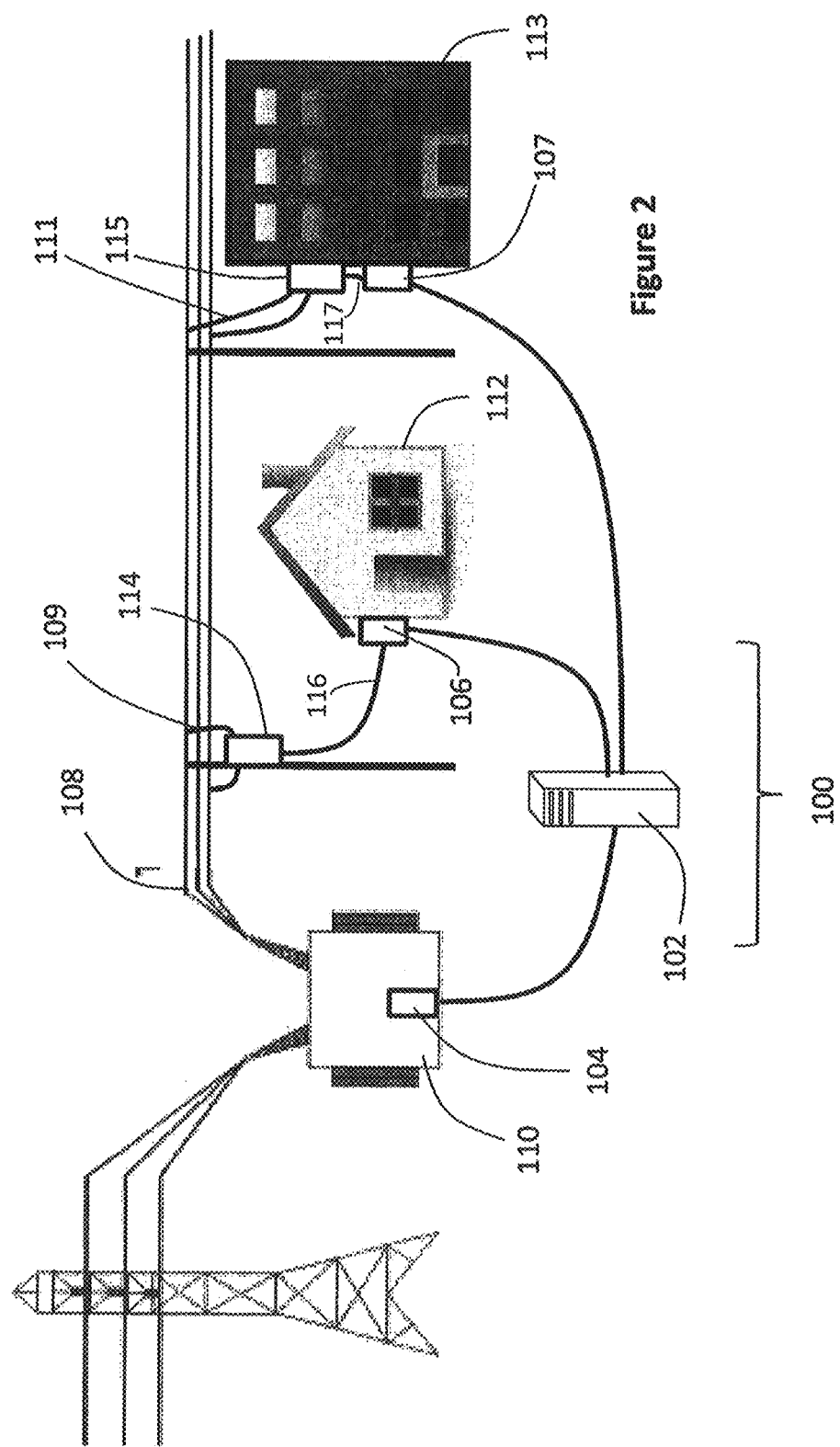
FIG. 2 is a schematic diagram of the components of the system that allow determination of the voltage phasors at the nodes.

Referring to FIG. 2, and according to one example embodiment, the feeder line measurement part of the system, 100, comprises a programmed computer 102 and multiple μPMUs, namely a substation μPMU 104 coupled to a substation 110 on a distribution feeder line 108, and one or more additional μPMUs ("customer site μPMU") which are each coupled to a respective transformer at a customer site, and wherein each transformer is coupled to the distribution feeder line 108 by a respective drop line 109 and 111 and is coupled to the customer site by a respective drop line 116 and 117. In this embodiment, there are two customer site μPMUs, namely: a first μPMU 106 at a residential site 112 ("residential PMU") coupled to a transformer 114 on a utility pole at that site ("residential transformer"), which in turn is coupled to the feeder line 108 by a residential drop line 109; and, a second μPMU 107 at a commercial site 113 ("commercial μPMU") coupled to a transformer 115 in a building on the commercial site 113 which in turn is coupled to the feeder line 108 by a commercial drop line 111. While this embodiment shows two customer site μPMUs at two customer sites, the system 100 can comprise as few as one customer site μPMU at one customer site, or more than two customer site μPMUs at more than two customer sites.

The μPMUs 104, 106, 107 are devices that are capable of measuring electricity parameters including voltage (V), current (I), real power (P) and reactive power (Q) in each phase. In addition to measuring these electricity parameters, the μPMUs 104, 106, 107 can measure the difference in the voltage phase angle between two points on a distribution feeder line 108 by referencing a common or shared time reference or can measure the amplitude and zero-crossing timestamps of voltage and current waveforms. While μPMUs are used in this embodiment, other types of PMU as known in the art can be substituted.

Referring now to FIGS. 2 and 3 together, substation 110 is considered the start of the distribution feeder line 108 and is herein referred to as the "Node 1" of the distribution feeder line 108. The substation μPMU 104 is installed in the substation 110, and thus provides the capability for power, voltage and current measurements at Node 1, wherein measurements at Node 1 will be denoted by the subscript "1". The connection point of residential drop line 109 to the distribution feeder line 108 is herein referred to as "Node 2" of the distribution feeder line 108 wherein measurements at Node 2 will be denoted by the subscript "2", and the connection point of the commercial drop line 111 to the distribution feeder line 108 is herein referred to as "Node 3" of the distribution feeder line 108 wherein measurements at Node 3 will be denoted by the subscript "3". Although only three nodes are shown in FIGS. 2 and 3 for the sake of simplicity, the system 100 can comprises additional nodes with corresponding drop lines and customer sites.

The substation μPMU 104 will provide the reference angle for the distribution feeder line 108. The phase angle of the voltage at the substation 110 is herein defined as $\delta_i=0$. The current in the feeder line 108 may have an angle $\phi_{12}$, representing the power factor (PF) of a feeder line sector between the first and second nodes. The known electricity parameters at the substation (Node 1) are thus: voltage magnitude $|V_1|$, voltage angle (which is 0 by definition, i.e. $\delta_1=0$), current magnitude and phase angle ($|I_{12}|$, $\phi_{12}$), and real and reactive power leaving Node 1 (substation 110) for Node 2 ($P_{12}$ and $Q_{12}$).

The portion of the distribution feeder line 108 between Node 1 and Node 2 is herein referred to as Feeder Sector 1, and the portion of the distribution feeder line 108 between Node 2 and Node 3 is herein referred to Feeder Sector 2.

At Node 2, the electricity parameters are referenced as: voltage ($|V_2|,\delta_2$), current along Feeder Sector 1 ($|I_{21}|,\phi_{21}$), and real and reactive power leaving Node 2 for Node 1 ($P_{21}$ and $Q_{21}$). None of these parameters are measured directly at Node 2, but can be determined from measurements taken by the substation and residential μPMUs 104, 106 respectively as will be discussed in detail below. Similarly, the electricity parameters at Node 3 are referenced as: voltage ($|V_3|,\delta_3$), current along Feeder Sector 2 ($|I_{32}|,\phi_{32}$), and real and reactive power leaving Node 3 for Node 2 ($P_{32}$ and $Q_{32}$); none of these parameters are measured directly at Node 3, but can be determined from measurements taken by the Node 1 substation 110 and commercial μPMUs 104, 107 respectively in a similar manner as used to determine the parameters at Node 2.

At the residential site 112, power is delivered from the feeder line 108 to a single customer that sees a distribution voltage drop ΔV across the residential drop line 109, the residential transformer 114, and drop line 116. The electricity parameter values at the residential site are herein denoted by the subscript "d2". The residential μPMU 106 is connected on the low voltage side of the residential transformer 114, and is configured to measure the consumption at the residential site 112. This measurement may involve measurement of the voltage phasor ($|V_{d2}|,\delta_{d2}$) and the current phasor ($|I_{d2}|,\phi_{d2}$) directly if the residential μPMU 106 has access to the timing reference measurements of the substation μPMU 104 if the residential μPMU 106 is communicative with substation μPMU 104. The measurement alternatively may involve measurement of the voltage magnitude and zero-crossing timestamps and the current magnitude and current zero-crossing timestamps if the residential μPMU 106 is not communicative directly with the substation μPMU 104. In this latter case, the calculation of the voltage phasor ($|V_{d2}|,\delta_{d2}$) and the current phasor ($|I_{d2}|,\phi_{d2}$) at the residential site 112 will be performed in the computer 102 which is communicative with both the residential μPMU 106 and the substation μPMU 104. Of note, the voltage and current magnitudes are measured at the residential site 112, and the voltage and current angles $\delta_{d2}$ and $\phi_{d2}$ are measured or calculated against the reference of the voltage phasor at the substation μPMU 104. Consequently, the real power $P_{d2}$, reactive power $Q_{d2}$, voltage $V_{d2}$ and current $I_{d2}$ values from the residential μPMU 106 readings measure the consumption at the residential site 112, and not the electricity parameter values in the distribution feeder line 108. Similarly, the electricity parameter values at the commercial site 113 are herein denoted by the subscript "d3", and the commercial μPMU 107 can measure the consumption at the commercial site 113 to obtain and parameter values $P_{d3}$, $Q_{d3}$, $|V_{d3}|$, $\delta_{d3}$, $|I_{d3}|$, and $\phi_{d3}$.

The computer 102 in this embodiment is a computer server having a processor and a memory having encoded thereon a feeder line parameter measurement program executable by the processor. The computer 102 is communicative with the substation μPMU 104 and with the customer site μPMUs 106, 107 via a communications network in a manner known in the art. While in this embodiment the computer is shown at a location remote from and directly communicative with each of the substation μPMU 104 and customer site μPMUs 106, 107, the computer 102 and μPMUs 104, 106, 107 can communicate in a different manner in the communication network as would be known to one skilled in the art. For example, the computer 102 can comprise multiple computer servers each directly coupled to a customer site μPMU, and each customer site μPMU can be configured to communicate with the substation μPMU to receive measurement data from the substation μPMU, such that each computer server would receive the substation and customer site measurement data directly via its connection to the customer site μPMU. In another example, the functionality of computer 102 may be performed by one or more of the μPMUs. In another example, the μPMUs 104, 106, 107 may communicate with the server computer 12 through gateways, such as local resource controllers (FIGS. 1 13,14, and 18).

The feeder line parameter measurement program when executed by the computer 102 can determine the phasor on the distribution feeder line 108 at the connection points of each drop line, i.e. a second node phasor ($|V_2|,\delta_2$) at Node 2, and a third node phasor ($|V_3|,\delta_3$) at Node 3. As described previously, it may determine intermediate values, such as ($|V_{d2}|,\delta_{d2}$), ($|I_{d2}|,\phi_{d2}$), ($|V_{d3}|,\delta_{d3}$), ($|I_{d3}|,\phi_{d3}$), first in order to calculate the second node phasor and third node phasor, as required. With the determined phasors at Node 2 and Node 3, the feeder line parameter measurement program can calculate the parameter values in a first sector of the feeder line 108 connecting the substation 110 to the second node (Feeder Sector 1) and the parameter values in a second sector of the feeder line 108 connecting the second node to the third node (Feeder sector 2). For each subsequent node (not shown), the voltages and angles from the previous node can be used to calculate the power flowing in the feeder line 108 between the previous and current nodes.

Figure 4:
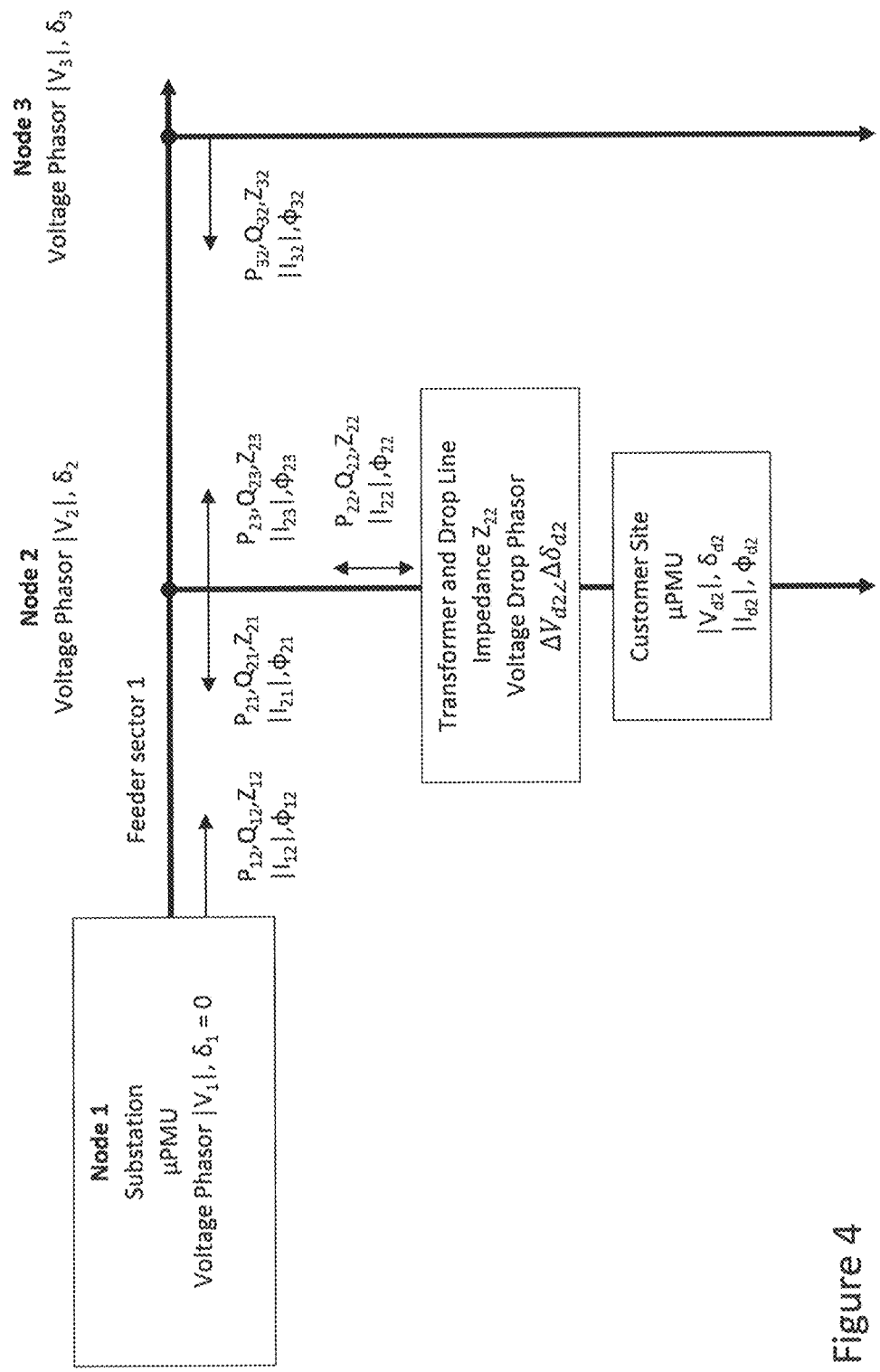
FIG. 4 is a schematic diagram of measuring electricity parameters on a distribution feeder line using the system shown in FIG. 2.

The steps carried out by the feeder line parameter measurement program to calculate the feeder line parameters are now described with reference to the diagram shown in FIG. 4 and the flowchart shown in FIG. 5. The feeder line parameter measurement program uses measurement data taken by the substation μPMU 104 and the customer site μPMUs 106, 107. For the sake of simplicity, the execution of the feeder line parameter measurement program is described with reference to the measurements taken by the residential μPMU 106 to determine the feeder line parameter values, with the understanding that the steps to determine the feeder line parameter values using the commercial μPMU 107 are similar.

The voltage and current phasors at the residential site ($|V_{d2}|, \delta_{d2}$), ($|I_{d2}|, \phi_{d2}$) are measured by the residential μPMU 106 or calculated by the computer 102. The impedance between the residential site 112 (i.e. at the location of the residential μPMU 106) and Node 2 is also used as an input by the feeder line parameter measurement program, and can be represented as:

$$Z_{22} = R_{22} + jX_{22}$$

wherein a resistance $R_{22}$ and a reactance $X_{22}$ (which includes the resistances and reactances of the drop lines 109, 116 and transformer 114) are: known values from the properties of the drop lines 109, 116 and transformer 114 at the residential site 112, measured by sensors at the residential site 112, or calculated from known properties and sensor measurements.

The voltage drop phasor (expressed as vector $\Delta V_{d2}$) from the second node (Node 2) to the residential site 112 is calculated using (step 401):

$$\Delta V_{d2L} \Delta \delta_{d2} = (I_{22L} \phi_{d2}) \left( Z_{22L} \tan^{-1} \frac{X_{22}}{R_{22}} \right)$$

wherein current magnitude $I_{22}$ is the current along the residential drop line 109 and is assumed to be equal to the measured residential site current magnitude $I_{d2}$, or calculated from the residential site current magnitude from a known or calculated current loss for the residential transformer 114 (step 402).

The feeder line parameter measurement program then calculates the voltage phasor at Node 2 ($|V_2|, \delta_2$) by adding the measured residential site voltage and the calculated voltage drop between Node 2 and the residential 112 site (Step 403), which is expressed mathematically as:

$$(|V_2|, \delta_2) = (|V_{d2}|, \delta_{d2}) + \Delta V_{d2} \angle \Delta \delta_{d2}$$

Once the voltage phasor at Node 1 is measured and the voltage phasor at Node 2 is determined, and the distribution feeder line impedance is known, all other electricity parameter values along the distribution feeder line 108 can be calculated by the feeder line parameter measurement program. In particular, the real power flow $P_{ij}$ (in Watts) and reactive power $Q_{ij}$ (in VARs) flow between two nodes i, j, in the feeder line 108 are calculated by the feeder line parameter measurement program (step 404 for Node 2 or 405 for Node 3 or greater) by applying the following general equations:

$$P_{ij} = \frac{1}{R^2 + X^2} (R|V_i|^2 - R|V_i||V_j|\cos\delta + X|V_i||V_j|\sin\delta) \text{ Watts}$$

And $$Q_{ij} = \frac{1}{R^2 + X^2} (X|V_i|^2 - X|V_i||V_j|\cos\delta + R|V_i||V_j|\sin\delta) \text{ VARs}$$

wherein R and X are the resistance and reactance of the feeder line sector between nodes i and j, respectively and here i=1 and j=2.

The feeder line parameter measurement program then calculates the apparent power $S_{ij}$ between Nodes i and j, in kilo volt-amps kVA (step 406), by applying the following equations:

$$kVA_{ij} = S_{ij} = \sqrt{P_{ij}^2 + Q_{ij}^2}$$

And line currents are calculated by:

$$I_{ij}^* = \frac{S_{ij}}{V_{ij}}$$

wherein $I_{ij}^*$ is the complex conjugate of $I_{ij}$.

The feeder line parameter measurement program then repeats the calculations for each subsequent node, based on the voltages at the current and subsequent nodes, and the angular difference between them. By executing this program, the system 100 provides a full set of parameter values for the operation of the feeder line 108.

Where the feeder line is mixed with single phase loads, the method may be applied to the single phase sectors of the feeder line.

While the illustrative embodiments of the present invention are described in detail, it is not the intention of the applicant to restrict or in any way limit the scope of the appended claims to such detail. Additional advantages and modifications within the scope of the appended claims will readily be apparent to those skilled in the art. The invention in its broader aspects is therefore not limited to the specific details, representative apparatus and methods, and illustrative examples shown and described. Accordingly, departures may be made from such details without departing from the spirit or scope of the general concept.

Power Delivery Control Program

Referring to FIG. 1, the server computer 12 has a processor and a memory on which is stored a power delivery control program which when executed by the processor processes the distribution line electrical parameters and controls the utility voltage management devices 23 and the real and reactive power resources 15, 16.

The power delivery control program controls the voltage along the feeder line by controlling the operation of the reactive power resources 16 and the utility voltage management devices 23 (collectively "voltage management devices") and controls the phase angle δ along the feeder line by controlling the operation of the real power resources 15.

Generally, the voltage magnitude between two adjacent nodes is similar, and the phase angle will generally be small. Under these conditions, the real power flow in the feeder line will tend to track the phase angle δ and the reactive power flow will track the difference in voltage between the sending and receiving nodes. Using these principles and as will be described in detail below, the power control program is able to determine the target phasor (voltage magnitude and phase angle) at each node that is required to deliver power to the feeder line at a defined feeder line power loss. The power control program also includes a voltage management device optimization module that can preferentially select certain voltage management devices over others, by assigning an operating cost to each voltage management device. In particular, the voltage management device optimization module assigns a relatively high operating cost to the substation tap changer 23 compared to the reactive power resources 16 in order to minimize the use of the tap changer 23 when controlling the voltage magnitude at each node along the feeder line.

The power control program also includes a load resource management module which comprises program code for determining which process load resources are available to provide power control, and also to select a cost-effective combination of available process load resources to provide this control.

According to one embodiment, the power delivery control program controls the voltage management resources to deliver a required amount of power to the feeder line 11 at an allowable voltage, while ensuring that this power is delivered with a feeder line power loss that is below a defined threshold and while minimizing the operation of the utility voltage management devices 23 and in particular, the substation tap changer.

Figure 5:
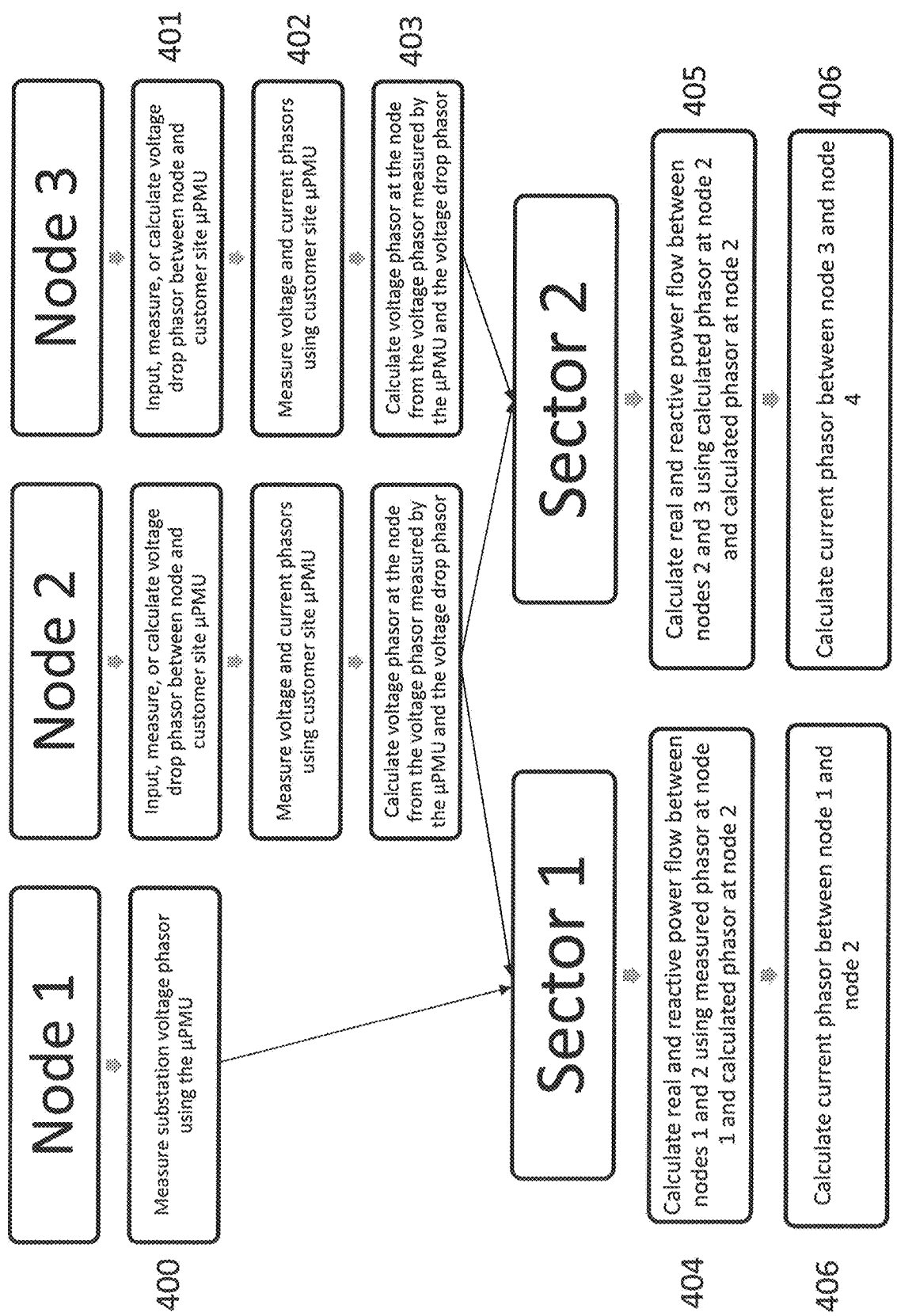
FIG. 5 is a flow chart of steps performed in measuring electricity parameters on a distribution feeder.

Referring now to FIG. 5, the measurement program determines the electrical parameters of the distribution line.

Figure 6:
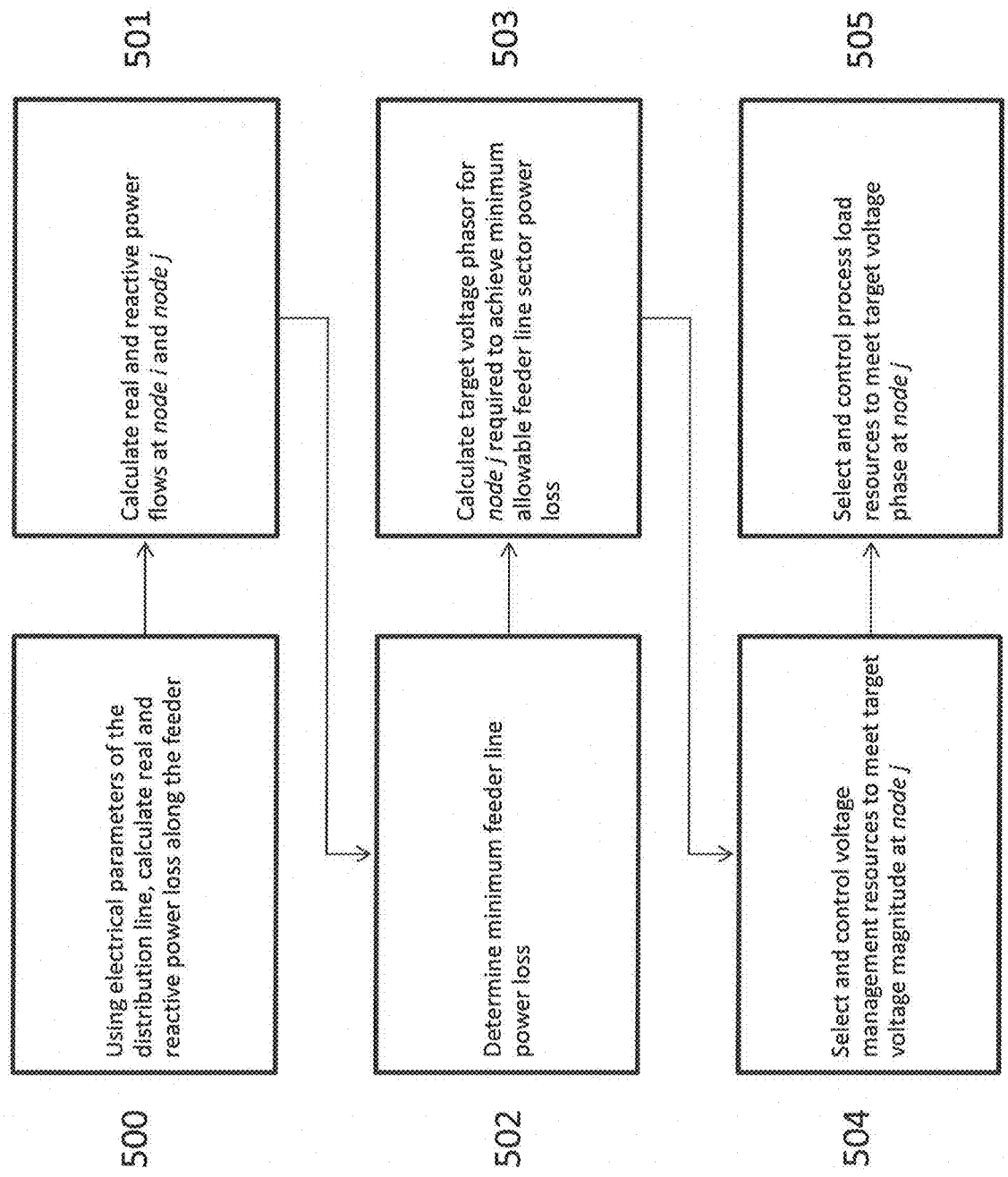
FIG. 6 is a flowchart illustrating execution of a distributed power delivery control program on the central server computer to generate target phasor instructions for each controlled node on the distribution feeder line according to a first embodiment.

Referring now to FIG. 6, the power control program when executed determines the target phasor of each node that is required to deliver power to the feeder line under the desired conditions, e.g., with minimal substation tap changer operation and minimal feeder line power loss, and selects the real and reactive power resources to meet these determined target phasors. The total real and reactive power loss on the feeder line 11 is calculated (step 500), by summing the real loss (i.e. $I_L^2 R_L$) and reactive power loss (i.e. $I_L^2 X_L$) on each line sector between the nodes.

The real and reactive power being removed or injected at each node 17 is calculated using the measured actual phasor at the nodes 17 (step 502). The real and reactive power must sum to zero at each node 17, so power in from an upstream location is equal to power removed at the node 17 plus power flowing down the next line sector. The real and reactive power at the sending (upstream) end of the line sector are determined by:

$$\text{Real Power (Watts)} = \frac{1}{R^2 + X^2}\left(R|V_S|^2 - R|V_S||V_R|\cos\delta + X|V_S||V_R|\sin\delta\right) \text{ and,} \quad (1)$$

$$\text{Reactive Power (VARs)} = \frac{1}{R^2 + X^2}\left(X|V_S|^2 - X|V_S||V_R|\cos\delta + R|V_S||V_R|\sin\delta\right) \quad (2)$$

wherein VS and VR are the sending and receiving end voltages of the line sector.

The real power and reactive power at the receiving (downstream) end of the line sector is:

$$\text{Real Power (Watts)} = \frac{1}{R^2 + X^2}\left(R|V_R|^2 - R|V_S||V_R|\cos\delta + X|V_S||V_R|\sin\delta\right) \text{ and} \quad (3)$$

$$\text{Reactive Power (VARs)} = \frac{1}{R^2 + X^2}\left(X|V_R|^2 - X|V_S||V_R|\cos\delta + R|V_S||V_R|\sin\delta\right) \quad (4)$$

Of note, the real and reactive power going in at the sending end of the line sector is different than the power flowing out of the receiving end of the line sector because of real and reactive power loss in the line sector. In other words, Power In−Line Loss=Power Out for both real and reactive power on each line sector.

Next, the minimal power loss when delivering the required power to the feeder line is calculated (step 502). To minimize power loss along the feeder line 11, the power delivery should be controlled to minimize current flow along the feeder line 11 while still meeting the power delivery and voltage requirements. This can be determined by selecting the power flow leaving each node (sending node) so that the real power leaving the sending node and going down the line sector is only enough to provide for the load at the adjacent downstream node (receiving node) and the line loss along the line sector between the sending and receiving nodes. Also, the reactive power on the line sector leaving each node should be zero; in other words, a reactive power resource at a node should inject only enough reactive power to supply the reactive power loss from the upstream line sector so that the outgoing line sector at the node carries no reactive power. Based on these principles, the allowable feeder line power loss threshold is calculated by:

a) starting at the end of the feeder line 11, calculate the current $I_L$, real power loss and reactive power loss on the last line sector using the measurements of the load and actual phasor at the last line sector;

b) calculate the real power delivered by the next upstream line sector to be the real power required by nodes on the last line sector plus the real power loss on that line sector; and c) calculate the reactive power required from a reactive power resource at the upstream node of the last line sector to be the reactive power required to replace the reactive power used by the last line sector.

Steps (a) to (c) are repeated at each upstream line sector for the entire feeder line 11 (i.e. back to the substation). The minimal total feeder line power loss is determined to be the sum of all of the determined line sector power losses.

Now that the reactive and real power at each node 17 to achieve the minimum total feeder line power loss have been determined, it is possible to determine the voltage magnitude and phase angle settings at each node 17 from equations (1) to (4). That is, equations (1) to (4) can be solved for $|V_S|$, $|V_R|$ and $\delta$ for each line sector L of the feeder line 11, working upwards from the last line sector and to the first line sector coupled to the substation.

An operational constraint is then assigned that represents the maximum allowable feeder line loss an operator will permit when controlling delivery of power to the feeder line 11 (herein referred to as "allowable feeder line power loss threshold"). The allowable feeder line power loss threshold can be set as the minimum feeder line power loss, in which case the determined voltage magnitudes and phase angles represent the target phasor for each node that must be met in order to achieve the minimum total feeder line power loss (step 503). Alternatively, the allowable feeder line power loss threshold can be a higher value as selected by an operator, in which case the target voltage magnitude and target phase angle are adjusted accordingly.

Next, the voltage management device optimization module is executed to select the voltage management devices that will be used to meet the target voltage magnitude at each node (step 504). As noted previously, the voltage management devices include the controllable reactive power resources 16 (i.e. capacitors, inductors, voltage inverters) at node sites 17 and the utility voltage management devices 23 at the substation, and these devices 16, 23 can be used to control the reactive power flows at each node 17 and the substation. As is well understood by those skilled in the art, capacitive reactive power resources 16 increase reactive power and consequently increase voltage magnitude at a node 17 and can be selected when the actual voltage magnitude is lower than the target voltage magnitude. Conversely, inductive reactive power resources 16 consume reactive power and consequently decrease voltage magnitude at a node 17 and thus can be selected when the actual voltage magnitude is higher than the target voltage magnitude.

The voltage management device optimization module determines which voltage management devices 16, 23 are available to achieve the target voltage magnitudes at each node 17, selects a cost effective combination of available voltage management devices 16, 23, then sends control signals to controllers of those selected voltage management devices 16, 23 to operate those devices accordingly. The selected combination can be the combination that provides the lowest operating cost, or any one of a number of combinations with have an operating cost below a selected threshold. Because not all nodes 17 may have a reactive power resource 16 that can be controlled by the system 10, it may not be possible to achieve the target voltage magnitudes at each node 17, in which case, the power delivery control program selects the available reactive power resources 16, 23 to come as close as possible to the target voltage magnitude.

Because frequent use of the substation tap changer is generally undesirable, the voltage management device optimization module assigns a comparatively higher operating cost to using the utility voltage management devices 23 and a comparatively lower operating cost to using the capacitors, inductors, and invertors 16 at the customer sites connected to nodes 17. The cost function for each reactive device 16, 23 is assigned based on actual cost. For example, a smart inverter can react quickly with little cost, and as a result is assigned a relatively low operating cost. Conversely, resources such as transformer tap changers that have life limits based on operations, are assigned a relatively high operating cost. Once the operating cost is assigned to each voltage management device 16, 23, a costing subroutine is executed to determine the available voltage management devices 16, 23 and their respective voltage settings.

Next, the power delivery control program executes a process load resource management module to select the real power resources 15 that will be used to meet the target phase angle at each node 17 (step 505). As noted previously, the real power resources 15 include controllable process load resources 15 that serve a primary process, and can be used by the system 10 to control phase angles along the feeder line 11 provided that the usage does not exceed the operational constraints dictated by the load resource's primary process. The use and selection of such process load resources 15 to provide load is disclosed in co-owned PCT application publication no. WO 2011/085477, and is hereby incorporated by reference.

The process load resource management module includes program code which determines which process load resources 14 are the most cost-effective to operate at any given time, then selects those process load resources 15 to meet the target phasor angle at each node along the feeder line. In order to determine the relative cost to operate a process load resource 15 at a particular point in time, the site control module programming includes a costing sub-routine which attributes a cost for operating each process load resource 15 at a particular point in time. The costing subroutine takes into consideration factors such as the cost that must be paid to the primary process operator of the device 16 for using the resource 16 at that time instance. The aggregated cost is then multiplied by a risk factor allocated to each resource 16 at that time instance; this risk factor takes into consideration the risk that over the period of time the resource 16 will be used to provide power delivery control, the primary process operator will override feeder line power control and use the resource 16 for its primary purpose. The costing sub-routine then selects a cost effective combination of process load resources to be operated; a cost effective combination can be the combination of on-line load resources having the lowest operational cost, or any one of a combination of load resources which fall within a defined operational cost budget.

Once the real power resources 15 and the reactive power resources 16 are selected, the system 10 transmits a control signal to the controller 13, 14 at each real and reactive power resource 15, 16 that contains the target phasor for the node of the real and reactive power resource 15, 16. The controllers 13, 14 then operate their associated real and reactive power resource 15, 16 to achieve the target phasor. That is, the load resource controller 13 will increase the load of its load resource when the measured phase angle at the node is lower than the target phase angle and decrease the load when the measured phase angle is higher than the target phase angle. The reactive power resource controller 14 will engage a capacitive resource 15 to generate reactive power at a node 17 when the measured voltage magnitude at the node is below the target voltage magnitude, and will engage an inductive resource 15 to consume reactive power at a node 17 when the measured voltage magnitude at the node 17 is below the target voltage magnitude. In this manner, the system 10 can provide localized control of the delivery of power to each node 17 along the feeder line 11, at a desirably low feeder line power loss (assuming the allowable feeder line power loss threshold is set at or near the minimum feeder line power loss), while keeping the substation tap changer operation at a minimum (assuming the tap changer 23 is assigned a relatively high operational cost).

Alternatively, the real power resources 15 can include generation resources, in which case, a process generation resource management module is provided to select the generation resource that will be used to meet the target phase angle at each node. Like the load resources, the generation resources can include resources which serve a primary process, in which case the system only controls those generation resources that are on-line, i.e. within the operational constraints of their primary process. In a manner similar to selecting a cost-effective combination of load resources, a costing sub-routine is executed and each available generation resource is assigned a relative operating cost, and the most cost-effective combination of generation resources is selected to meet the target phasor angle at each node along the feeder line. Once the generation resources are selected, the system 10 sends a control signal to each controller of the selected generation resource that contains the target phasor for the node of the generation resource. The controllers then operate their associated generation resource to achieve the target phasor. That is, the generation resource controller will increase the generation of its load resource when the measured phase angle at the node is higher than the target phase angle, and decrease the generation when the measured phase angle is lower than the target phase angle.

According to another embodiment, the power delivery control program uses optimal power flow (OPF) algorithms that are based on a closed form solution for radial distribution systems to control the utility voltage management devices 23 and at least the reactive power resources 16 to deliver a required amount of reactive power to the feeder 11 to bring the voltage to acceptable levels, while minimizing the power loss and minimizing the operation of the utility voltage management devices 23 and in particular, the substation tap changer.

Such a closed form solution is expected to be more computationally tractable than complex generic algorithms which tend to be relatively computationally demanding; as a result, the power delivery control program is expected to be able to react more quickly to changes in the distribution feeder than a program executing complex optimization problems, which is desirable for distribution feeders containing intermittent generation sources such as solar and wind power generators.

An embodiment of the closed form solution used by the power delivery control program to set the target phasor for each node will now be described. This embodiment assumes a balanced, radial distribution system that can be reduced to a single-phase system. This embodiment is expressed in polar form, and allows for a variable ratio of reactive power injection at each of the upstream and downstream nodes i,j.

Figure 7:
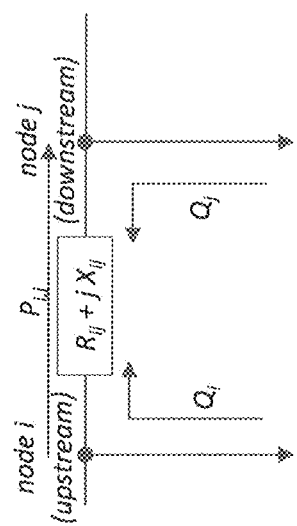
FIG. 7 is a schematic illustration of a feeder sector and two adjacent nodes of the distribution feeder.

Referring to FIG. 7, each feeder sector extends from an upstream node i to a downstream node j individually and assumes that the shunt capacitance can be neglected. The voltage phasor at sending end $V_{ij}$, the line current phasor $I_{ij}$ and the line admittance $Y_{ij}$ comprising admittance $G_{ij}+j\,B_{ij}$, are defined as follows:

$$V_i = |V_i| \angle \delta_i \tag{5}$$

$$V_j = |V_j| \angle \delta_j \tag{6}$$

$$I_{ij} = |I_{ij}| \angle \delta_{I_{ij}} \tag{7}$$

$$Y_{ij} = G_{ij} + jB_{ij} = \frac{1}{R_{ij} + jX_{ij}} \tag{8}$$

wherein $\delta_i$ is the phase angle at node i, $\delta_j$ is the phase angle at node j, and $\delta_{I_{ij}}$ is the phase angle of the line current in the line sector ij.

The current ($I_{ij}$) in the feeder sector is defined as:

$$I_{ij} = (V_i - V_j)Y_{ij} = \frac{P_{ij} - jQ_{ij}}{V_i^*}$$

where $V_i$ and $V_j$ are the voltage phasors at sending and receiving end and $Y_{ij}$ is the line admittance, $P_{ij}$ is the real power flow from node i to node j and $Q_{ij}$ is the reactive power flow from node i to node j.

$P_{ij}$ in the feeder sector is expressed in equation (8) as:

$$P_{ij} = \text{Re}\{((V_i - V_j)(Y_{ij}))^* V_i\} \tag{10}$$

The power loss $P_{loss\ ij}$ in the feeder sector is:

$$P_{loss\,ij} = R_{ij}|I_{ij}|^2 = R_{ij}\left|\frac{P_{ij} - jQ_{ij}}{V_i^*}\right|^2 \tag{11}$$

The voltage drop from node i to node j $\Delta V_{ij}$ as defined in equation (10) is:

$$\Delta V_{ij} = V_i - V_j = \frac{R_{ij}P_{ij} + X_{ij}Q_{ij}}{V_i^*} + j\frac{X_{ij}P_{ij} + R_{ij}Q_{ij}}{V_i^*} \tag{12}$$

If $P_{ij} \gg Q_{ij}$ in (8) and (9), these equations reduce to equations (11) and (12):

$$P_{loss\,ij} = R_{ij}\left|\frac{P_{ij}}{V_i^*}\right|^2 \tag{13}$$

$$\Delta V_{ij} = \frac{R_{ij}P_{ij}}{V_i^*} + j\frac{X_{ij}P_{ij}}{V_i^*} \tag{14}$$

Equations (13) and (14) suggest that reducing the reactance flow $Q_{ij}$ from node i to node j significantly decreases the power loss $P_{loss\ ij}$ and the voltage drop $\Delta V_{ij}$, for equal $P_{ij}$. In the proposed closed form solution, the goal is to drive the voltage at the receiving end $V_j$ to prevent reactive power flow $Q_{ij}$ in the feeder sector while maintaining real power flow $P_{ij}$ through the feeder sector. The consumed reactive power by the line ($Q_{line}=|I_{ij}|^2 X_{ij}$) will be supplied from the two adjacent nodes according to equation (13):

$$aQ_{ij} = Q_{ji} = \frac{Q_{line}}{a+1} \tag{15}$$

where $\alpha$ is the ratio between the reactive power supply from the sending end $Q_{ij}$ and receiving end $Q_{ji}$ ("Q-ratio"). The two conditions lead to equations (27) where $P_{ij}$ is the real power flow before optimization that shall be maintained and therefore is a constant obtained by equation (8):

$$\begin{cases} aQ_{ij} = Q_{ji} \\ P_{ij\,new} = P_{ij} \end{cases} \tag{16}$$

Using the equation for complex power (S=VI*), equation (15) can be formulated:

$$\begin{cases} a \cdot \text{Im}(V_i I_{ij}^*) = \text{Im}(V_j(-I_{ij})^*) \\ \text{Re}(V_i I_i^*) = P_{ij} \end{cases} \tag{17}$$

Substituting equations (3), (4) (5) in (14) and rearranging yields equation (16) with unknown $|V_j|$:

$$\frac{\left(P + G_{ij}\left(\frac{(Vi^2 a - Vj^2)B_{ij}^2 - G_{ij}(P - G_{ij}Vi^2)(a+1)}{(a-1)B_{ij}^2 + (a+1)G_{ij}^2} - Vi^2\right)\right)^2}{B_{ij}^2} - \left(\frac{(Vi^2 a - Vj^2)B_{ij}^2 - G_{ij}(P - G_{ij}Vi^2)(a+1)}{(a-1)B_{ij}^2 + (a+1)G_{ij}^2}\right)^2 - Vi^2 Vj^2 = 0 \tag{18}$$

wherein each reference to "G", "P", "B" in equation (16) respectively means "$G_{ij}$", "$P_{ij}$" and "$B_{ij}$"

From equation (16), the voltage magnitude at the receiving end $|V_j|$, can be expressed as a function of the voltage magnitude at sending end $|V_j|$, the line admittance $G_{ij}$, $B_{ij}$ and power flow from node i to node j $P_{ij}$ and Q-ratio $\alpha$ to produce equation (17):

$$|V_j| = f(|V_i|, G_{ij}, B_{ij}, P_{ij}, \alpha) \tag{19}$$

Similarly, the voltage phase angle at receiving end $\delta_j$ can be expressed as a function of the voltage magnitude at sending and receiving end $|V_i|$, $|V_j|$, the line impedance $G_{ij}$, $B_{ij}$, and phase angle at sending end $\delta_i$ and Q-ratio $\alpha$ to produce equation (18):

$$\delta_j = f(|V_i|, |V_j|, G_{ij}, B_{ij}, P_{ij}, \alpha) \tag{20}$$

Solving equation (18) leads to a closed form solution for $|V_j|$ in equation (21) and $\delta_j$ in equation (22):

$$V_j = \sqrt{\frac{\begin{array}{c}B_{ij}^2 M - G_{ij}^2 M + B_{ij}^4 V_i^2 + G_{ij}^4 V_i^2 - B_{ij}^2 aM - G_{ij}^2 aM + \\ 2G_{ij}^4 V_i^2 a + 2B_{ij}^2 G_{ij}^2 V_i^2 + B_{ij}^4 V_i^2 a^2 + G_{ij}^4 V_i^2 a^2 - \\ 4B_{ij}^2 G_{ij} P_{ij} + 2B_{ij}^2 G_{ij}^2 V_i^2 a^2 + 2B_{ij}^2 G_{ij}^2 V_i^2 a\end{array}}{2B_{ij}^4 + 2B_{ij}^2 G^2}} \quad (21)$$

where $$M = \sqrt{\frac{(B_{ij}^2 V_i^2 + G_{ij}^2 V_i^2 - 2B_{ij} P_{ij} + B_{ij}^2 V_i^2 a + G_{ij}^2 V_i^2 a)}{(B_{ij}^2 V_i^2 + G_{ij}^2 V_i^2 + 2B_{ij} P_{ij} + B_{ij}^2 V_i^2 a + G_{ij}^2 V_i^2 a)}}$$

$$\delta_j = \delta_j - \cos^{-1}\left(\frac{(aV_i^2 - V_j^2)B_{ij}^2 - G_{ij}(P - G_{ij}V_i^2)(a+1)}{V_i V_j ((a-1)B_{ij}^2 + (a+1)G_{ij}^2)}\right) \quad (22)$$

Equations (21) and (22) provide a target voltage phasor at the receiving end of a feeder sector that assures that there is no Q flow while the real power flow $P_{ij}$ is maintained with respect to a given sending end voltage phasor $V_i$.

For a radial distribution system, the OPF solution provided in equations (21), (22) at each node can be calculated starting from the substation, successively node by node downstream to the feeder end. The advantage of the proposed closed-form OPF is its fast computation and that it does not require iterative power flow algorithms. Furthermore, it works for bi-directional power flow.

Figure 8:
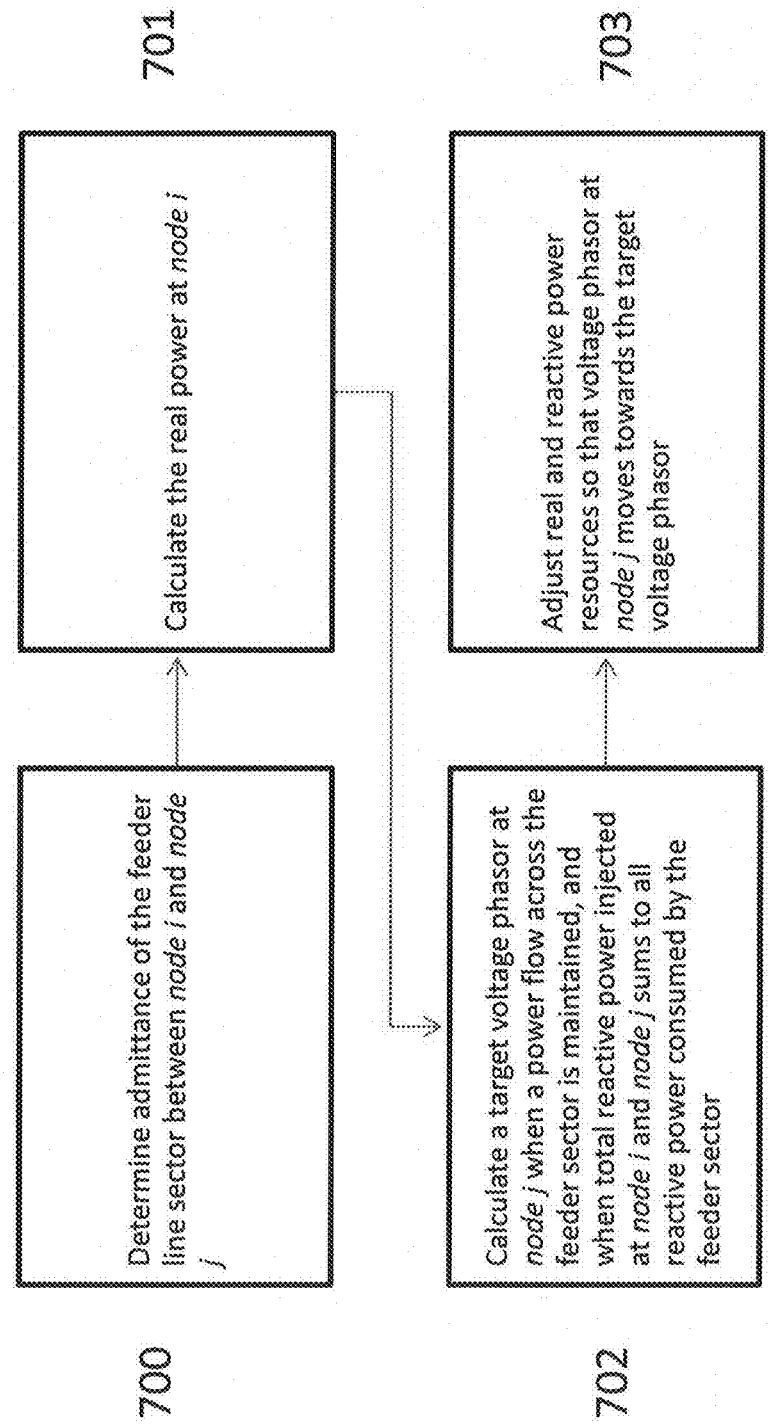
FIG. 8 is a flowchart illustrating execution of a distributed power delivery control program on the central server computer to generate target phasor instructions for each controlled node on the distribution feeder line according to a second embodiment.

FIG. 8 is a flowchart illustrating a method for locally controlling delivery of electrical power along a distribution feeder 11 using a system 10 that executes the power delivery control program based on an embodiment wherein equal reactive power is injected at each node to consume all the reactive power in the feeder sector. The system 10 comprises controllers 13, 14 for controlling both controllable real and reactive power resources on the distribution feeder 11.

As noted above, the power delivery control program calculates the target voltage phasor for the downstream node 17 in each feeder sector of the feeder distribution line 11 in succession, starting from the known voltage phasor at the substation 23 and working downstream one feeder sector at a time (the phase angle at the substation is defined to be at angle zero). Thus, the first feeder sector in the distribution line 11 uses the voltage phasor at the substation 23 as the input values for the real and imaginary parts of the voltage at the upstream node $v_{ire}$, $v_{iim}$.

The power delivery control program is provided with or determines the admittance value $Y_{ij}$ of the feeder sector (step 700). The admittance can be determined from the known resistance and reactance of the feeder sector.

The real power at the upstream node i is available from the measurement program. As noted above, this value is input into the power delivery control program as the power flow $P_{ij}$ across the feeder sector (step 701).

The inputted real and imaginary parts of the voltage at the upstream node $v_{ire}$, $v_{iim}$, the determined admittance value $Y_{ij}$ and the measured power flow value $P_{ij}$ are used by the power delivery control program in equations (14) and (15) to solve for the real and imaginary parts of the voltage at the downstream node $v_{jre}$, $v_{jim}$. The target voltage phasor (comprising the target voltage magnitude and phase angle) at the downstream node is then determined by solving equations (16) and (17) (step 702).

The results of the measurement program also provide the actual phasor at the downstream node 17. The actual phasor measurements consists of the voltage magnitude $|V|$ and angle $\delta$ at the downstream node 17. The real and/or reactive power controllers 13, 14 at the downstream node receive their target voltage phasor from the power delivery control program, and receive the actual voltage phasor measurements from the measurement program. With these inputs, the real and/or reactive power controllers 13, 14 can determine the difference between the actual voltage magnitude and phase angle and the target voltage angle and phase angle.

The real and/or reactive power controllers 13, 14 then selects one or more real and/or reactive power resources 15, 16 to control to cause the actual voltage magnitude and phase angle at the downstream node to move towards its target voltage magnitude and phase angle, then operates their selected real and/or reactive power resources 15, 16 accordingly (step 703). As noted previously, the controllable reactive power resources 16 at node sites 17 can be used to control the reactive power injection at each node 17 and the substation. As is well understood by those skilled in the art, reactive power resources 16 such as capacitors increase reactive power and consequently increase voltage magnitude at a node 17 and can be selected when the actual voltage magnitude is lower than the target voltage magnitude. Conversely, reactive power resources 16 that consume reactive power and consequently decrease voltage magnitude at a node 17 can be selected when the actual voltage magnitude is higher than the target voltage magnitude; examples of such reactive power resources include PV inverters and static synchronous compensators (STATSCOMs), which can be operated in inductive mode to lower the voltage as required.

The above steps are repeated for each line sector between two nodes along the entire distribution feeder 11. For the first line sector, the reference voltage at the upstream node will be the voltage phasor at the substation 23. Applying steps 700 to 703 will provide a voltage target at the downstream node (first node 17 after the substation 23). For the second line sector, the voltage phasor at the upstream node will be the target voltage phasor at the downstream node of the first line sector. This sequence is repeated for each feeder sector until the last node is reached within the distribution feeder 11.

Figure 9:
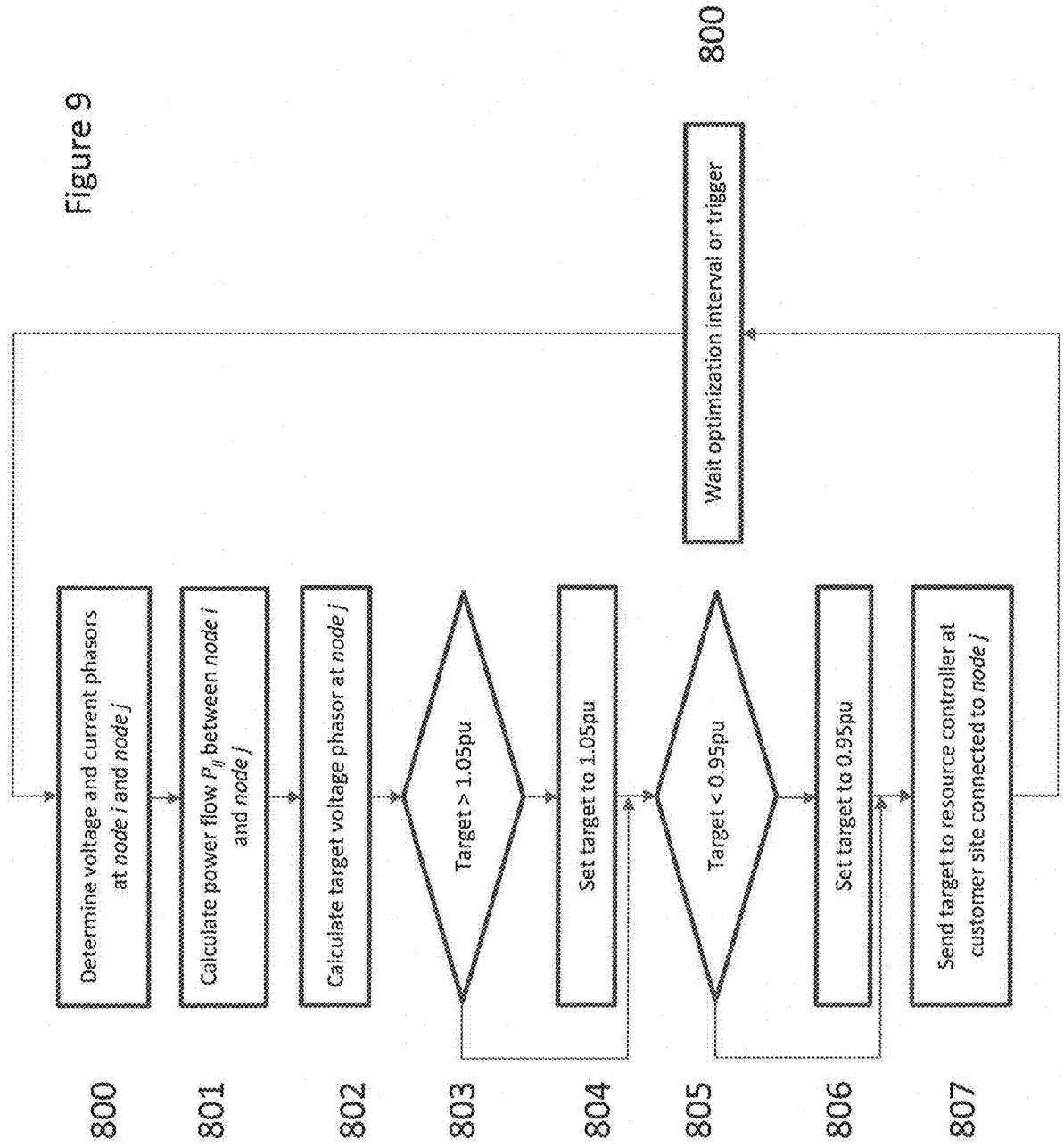
FIG. 9 is a flowchart illustrating execution of a distributed power delivery control program on the central server computer to generate target phasor instructions for each controlled node on the distribution feeder line according to a third embodiment.

FIG. 9 is a flowchart illustrating a method for locally controlling delivery of electrical power along a distribution feeder 11 using a system 10 that executes the power delivery control program based on another embodiment of the closed-form solution, which is implemented in the central control server 12 within a repeated routine. The central control server 12 obtains voltage phasors $V_i$ and $V_j$ at the upstream and downstream nodes using the results of the measurement program at each node i, j (step 800); determines the admittance of the feeder $Y_{ij}$ then calculates the actual power flow $P_{ij}$ through each feeder sector using equation (23) (step 801); determines the line admittance values $B_{ij}$ and $G_{ij}$ then calculates the target voltage phasor of the downstream node j using the closed-form equations (21, 22) (step 802); ensures that target phasor is within the voltage limits of 0.95 and 1.05 pu (steps 803-806); and dispatches target voltage phasor to the resource controller at the downstream node (step 807). This routine is repeated continually for each successive pair of adjacent nodes.

In some embodiments, the real and/or reactive power resources 15, 16 do not have any operational constraints, and the power delivery control program should be able to control the power delivery along the feeder sector with a minimum power loss. In other embodiments, the real and/or reactive power resources can be provided with operational constraints. For example, an operational constraint can be assigned that represents the maximum available reactive power resources. If the maximum available reactive power resources are not sufficient to track the voltage phasor targets, a new set of target voltage phasors for the entire feeder line should be computed considering the reactive power constraints. In another example, an operational constraint can be assigned that represents a maximum threshold on the line current in each sector, as the feeders have a maximum current constraint.

There is provided, for managing an electrical grid distribution feeder line responsively to characterized electrical parameters thereat, the line having a first line node being a substation with an associated voltage controller that is adapted to control the voltage thereat, and, downstream thereof, a second line node that is electrically coupled to a customer's energy resource (that generates or consumes electricity), a method of characterizing the voltage phasor at the second line node for a period of time, comprising the steps: (i) coupling a first μPMU at said first line node that is adapted to timestamp measure the electrical voltage and current waveforms thereat; (ii) (a) coupling a voltage transformer between said second line node and said customer's energy resource with drop lines, and (b) coupling a second μPMU on the drop between the transformer and said customer's energy resource, that is adapted to timestamp measure the electrical voltage and current waveforms thereat; (iii) making said first μPMU timestamped measurements and making said second μPMU timestamped measurements and time-synchronizing one of said first μPMU timestamped measurements with one of said second μPMU timestamped measurements; (iv) determining, for the period, the impedances of said drop lines and said transformer between said second line node and said customer's energy resource; (v) determining, for the period, the voltage at the second line node based on said drop line impedances and said transformer impedance and said second μPMU measurements; and (vi) informing said determined second line node voltage, to said voltage controller.

There is further provided the preceding wherein the customer's energy resource has a resource controller that is adapted to control the energy resource to change its real or reactive power consumption or generation to predictably cause a change in the voltage waveforms at the second line node, and the voltage controller is adapted to determine voltage control targets for the substation and the customer's energy resource, and additionally comprises the steps: (vii) determining a voltage target for the customer's energy resource coupled to the second line node; and (vii) determining a voltage target for the substation; and (viii) informing said determined voltage target at the second line node to customer's energy resource controller to adjust the voltage thereat.

There is further provided the preceding wherein the voltage target for the substation control and the voltage target for the customer's energy resource control are determined to reduce the amount of substation control needed.

There is further provided the preceding wherein the voltage target for the substation control and the voltage target for the customer's energy resource control are determined to reduce the amount of energy lost in the feeder line.

There is further provided the preceding wherein the voltage target for the substation control and the voltage target for the customer's energy resource control are determined to trade off between the amount of substation control and the amount of energy loss in the feeder line.

There is further provided the preceding wherein the trade off between substation control and energy loss is based on the cost of wear and tear on the substation equipment and the value of the energy lost in the feeder line.

There is further provided the preceding wherein the voltage target for the substation control and the voltage target for the customer's energy resource control are determined to optimally minimize reactive power flow in the feeder line subject to the constraints of the substation control and the customer's energy resource and the costs of the wear-and-tear on the substation control and the impact to the customer of controlling its energy resource.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method for controlling delivery of electric power along a distribution feeder line, the method comprising:
   making first timestamped measurements with a first µPMU, wherein the first timestamped measurements comprise measurements of the electrical voltage and current waveforms on the distribution feeder line at a first line node;
   making second timestamped measurements with a second µPMU, wherein the second timestamped measurements comprise measurements of the electrical voltage and current waveforms on a drop line between a transformer and an energy resource at a second line node;
   time-synchronizing one of the first timestamped measurements with one of the second timestamped measurements;
   determining, for a period, a voltage phasor at the second line node based on the time-synchronized second timestamped measurement; and
   informing the second line node voltage phasor to a controller.

2. The method of claim 1, further comprising:
   determining, via the controller, a target voltage phasor at the second line node based on the second line node voltage phasor;
   sending the second line node target voltage phasor to a resource controller; and
   controlling, via the resource controller, the energy resource based on the second line node target voltage phasor.

3. The method of claim 1, further comprising determining an impedance between the second line node and the energy resource based on the time-synchronized second timestamped measurement, wherein determining the second line node voltage phasor is further based on the impedance.

4. The method of claim 1, further comprising:
   determining, for the period, a voltage phasor at the first line node based on the time-synchronized first timestamped measurement; and
   informing the first line node voltage phasor to the controller.

5. The method of claim 4, further comprising controlling delivery of electric power along the distribution feeder line based on the first line node voltage phasor and the second line node voltage phasor.

6. The method of claim 4, further comprising:
   determining, via the controller, a target voltage phasor at the second line node based on the first line node voltage phasor and the second line node voltage phasor;
   sending the second line node target voltage phasor to a resource controller; and
   controlling, via the resource controller, the energy resource based on the second line node target voltage phasor.

7. The method of claim 4, further comprising:
   determining, for the period, the real power between the first line node and the second line node based on the first line node voltage phasor and the second line node voltage phasor;
   determining, for the period, the reactive power between the first line node and the second line node based on the first line node voltage phasor and the second line node voltage phasor; and
   determining, for the period, a current phasor between the first line node and the second line node based on the real power and the reactive power.

8. The method of claim 7, further comprising, controlling delivery of electrical power along the distribution feeder line based on:
   the first line node voltage phasor;
   the second line node voltage phasor;
   the current phasor; or
   a combination thereof.

9. The method of claim 4, further comprising:
   determining, via the controller, a target voltage phasor at the first line node based on the first line node voltage phasor and the second line node phasor; and
   controlling at least one of a plurality of energy resources connected to the distribution feeder line based on the first line node target voltage phasor.

10. The method of claim 9, wherein the energy resource is one of the at least one of the plurality of energy resources that is controlled.

11. A system for controlling delivery of electric power along a distribution feeder line, the system comprising:
a first μPMU at a first line node being a substation that, wherein the first μPMU is operable to take first timestamped measurements of the electrical voltage and current waveforms at the first line node;
a second μPMU at a second line node being a connection point of the distribution feeder line and a drop line to an energy resource, wherein the second μPMU is operable to take second timestamped measurements of the electrical voltage and current waveforms at the second line node;
a resource controller at the second line node operable to control the energy resource;
a computer operable to:
receive the first timestamped measurements of the electrical voltage and current waveforms at the first line node from the first μPMU;
receive the second timestamped measurements of the electrical voltage and current waveforms at the second line node from the second μPMU;
time-synchronize one of the first timestamped measurements and one of the second timestamped measurements;
determine, for a period, a voltage phasor at the first line node based on the time-synchronized first timestamped measurement;
determine, for the period, a voltage phasor at the second line node based on the time-synchronized second timestamped measurement; and
control the delivery of electric power along the distribution feeder line based on the first line node voltage phasor and the second line node voltage phasor.

12. The system of claim 11, wherein control of the delivery of electric power along the distribution feeder line comprises the computer to control electric power delivery of the sub station.

13. The system of claim 11, wherein control of the delivery of electric power along the distribution feeder line comprises the computer to:
determine a target voltage phasor at the second line node based on the first line node voltage phasor and the second line node voltage phasor; and
send the second line node target voltage phasor to the resource controller, wherein the resource controller is operable to control the energy resource based on the second line node target voltage phasor.

14. The system of claim 11, wherein the computer is further operable to:
determine a target voltage phasor at the first line node based on the first line node voltage phasor and the second line node voltage phasor; and
determine a target voltage phasor at the second line node based on the first line node voltage phasor and the second line node voltage phasor, wherein the computer controls the delivery of electric power along the distribution feeder line based on the first line node target voltage phasor and the second line node target voltage phasor.

15. The system of claim 11, further comprising:
a third μPMU at a third line node being an another connection point of the distribution feeder line and an another drop line to an another energy resource, wherein the third μPMU is operable to take third timestamped measurements of the electrical voltage and current waveforms at the third line node, wherein the computer is further operable to:
receive the third timestamped measurements of the electrical voltage and current waveforms at the third line node from the third μgMU;
time-synchronize one of the third timestamped measurements with the time-synchronized first timestamped measurement and time-synchronized second timestamped measurement;
determine, for the period, a voltage phasor at the third line node based on the time-synchronized third timestamped measurement; and
control the delivery of electric power along the distribution feeder line based on the first line node voltage phasor, the second line node voltage phasor, and the third line node voltage phasor.

16. The system of claim 15, further comprising an another resource controller operable to control the another energy resource, wherein control of the delivery of electric power along the distribution feeder line comprises the computer to:
determine a target voltage phasor at the second line node based on the first line node voltage phasor, the second line node voltage phasor, the third line node voltage phasor, or a combination thereof;
send the second line node target voltage phasor to the resource controller, wherein the resource controller is operable to control the energy resource based on the second line node target voltage phasor;
determine a target voltage phasor at the third line node based on the first line node voltage phasor, the second line node voltage phasor, the third line node voltage phasor, or a combination thereof; and
send the third line node target voltage phasor to the another resource controller, wherein the another resource controller is operable to control the another energy resource based on the third line node target voltage phasor.

17. The system of claim 15, wherein the computer is further operable to determine a target voltage phasor at the first line node, a target voltage phasor at the second line node, and a target voltage phasor at the third line node based on the first line node voltage phasor, the second line node voltage phasor, the third line node voltage phasor, or a combination thereof, wherein the computer controls the delivery of electric power along the distribution feeder line based on the first line node target voltage phasor, the second line node target voltage phasor, and the third line node target voltage phasor.

18. One or more non-transitory computer readable media encoding instructions embodied thereon that, when executed by one or more computing devices, cause the one or more computing devices to:
receive, from a first μPMU, first timestamped measurements, wherein the first timestamped measurements comprise measurements of the electrical voltage and current waveforms on a distribution feeder line at a first line node;
receive, from a second μPMU, second timestamped measurements, wherein the second timestamped measurements comprise measurements of the electrical voltage and current waveforms on drop line connected to an energy resource at a second line node;
time-synchronize one of the first timestamped measurements with one of the second timestamped measurements;

determine, for a period, a voltage phasor at the first line node based on the time-synchronized first timestamped measurement;

determine, for the period, a voltage phasor at the second line node based on the time-synchronized second timestamped measurement; and control the delivery of electric power along the distribution feeder line based on the first line node voltage phasor and the second line node voltage phasor.

19. The non-transitory computer readable media of claim 18, wherein the instructions further cause the one or more computing devices to:

determine a target voltage phasor at the first line node based on the first line node voltage phasor and the second line node voltage phasor; and determine a target voltage phasor at the second line node based on the first line node voltage phasor and the second line node voltage phasor, wherein the one or more computing devices control the delivery of electric power along the distribution feeder line based on the first line node target voltage phasor and the second line node target voltage phasor.

20. The non-transitory computer readable media of claim 18, wherein the instructions further cause the one or more computing devices to:

determine a target voltage phasor at the second line node based on the first line node voltage phasor and the second line node voltage phasor; and send the second line node target voltage phasor to a resource controller that is operable to control the energy resource based on the second line node target voltage phasor.

\* \* \* \* \*